United States Patent [19]

Jung et al.

[11] Patent Number: 5,493,011
[45] Date of Patent: Feb. 20, 1996

[54] MONOAZO OR DISAZO PIGMENTS BASED ON (BENOXAZOL-2-YL)- OR (BENZIMIDAZOL-2-YL)-ARYLACETAMIDES

[75] Inventors: Rüdiger Jung, Kelkheim/Taunus; Reinhold Deubel, Bad Soden am Taunus, both of Germany

[73] Assignee: Hoechst AG, Germany

[21] Appl. No.: 934,479

[22] Filed: Nov. 6, 1992

[30] Foreign Application Priority Data

Mar. 9, 1990 [DE] Germany .................... 40 07 535.4

[51] Int. Cl.$^6$ .................... C09B 29/32; C09B 35/035; C08K 5/23; D06P 1/44
[52] U.S. Cl. .................... 534/751; 534/575; 534/581; 534/602; 534/637; 534/655; 534/752; 534/758; 534/761; 534/764; 534/796; 534/797; 534/887; 548/217; 548/219; 548/300.4; 548/305.1; 548/305.4; 548/309.7; 106/22 K; 106/496; 524/87; 524/92; 524/93; 8/506; 8/508; 8/510; 8/514; 8/637.1; 8/639; 8/657; 8/658
[58] Field of Search .................... 534/575, 581, 534/605, 612, 655, 751, 752, 758, 761, 764, 796, 797; 548/217, 219, 300.4, 305.1, 305.4, 309.7; 106/498; 524/87, 92, 93; 8/508, 510, 514, 637.1, 655, 657, 658

[56] References Cited

U.S. PATENT DOCUMENTS

| | | | |
|---|---|---|---|
| 3,313,798 | 4/1967 | Dehnert et al. | 534/751 |
| 3,586,694 | 6/1971 | Shen et al. | 548/309.4 |
| 3,590,047 | 6/1971 | Shen et al. | 548/309.4 |
| 3,609,135 | 9/1971 | Ribka | 534/575 |
| 3,684,808 | 8/1972 | Ulrich | 534/596 X |
| 3,829,418 | 8/1974 | Raue et al. | 534/751 |
| 3,971,741 | 7/1976 | Dehmel et al. | 534/575 X |
| 3,997,523 | 12/1976 | Laubert et al. | 534/573 |
| 4,024,124 | 5/1977 | Ribka | 534/575 X |
| 4,064,136 | 12/1977 | Loew et al. | 548/152 |
| 4,113,718 | 9/1978 | Loew et al. | 534/609 |
| 4,150,019 | 4/1979 | Frolich et al. | 534/575 X |
| 4,220,586 | 9/1980 | Cseh et al. | 534/575 X |
| 4,288,362 | 9/1981 | Rolf et al. | 534/751 X |
| 4,403,077 | 9/1983 | Uhrig et al. | 525/502 |
| 4,686,287 | 8/1987 | Hunger et al. | 534/742 |

FOREIGN PATENT DOCUMENTS

| | | | |
|---|---|---|---|
| 737876 | 2/1970 | Belgium | 534/575 |
| 815673 | 11/1974 | Belgium . | |
| 1155836 | 10/1983 | Canada | 534/575 |
| 0158888 | 10/1985 | European Pat. Off. . | |
| 0065751 | 1/1986 | European Pat. Off. . | |
| 1350546 | 12/1963 | France . | |
| 1565851 | 5/1969 | France | 534/581 |
| 1580823 | 8/1969 | France . | |
| 2090144 | 1/1972 | France . | |
| 2309608 | 11/1976 | France . | |
| 1906241 | 9/1969 | Germany | 534/573 |
| 2024281 | 12/1971 | Germany . | |
| 2232449 | 1/1974 | Germany | 534/751 |
| 2632402 | 2/1977 | Germany . | |
| 972955 | 10/1964 | United Kingdom . | |

OTHER PUBLICATIONS

Sumitomo Chemical Co. Ltd., Derwent Abstract of JP 48/34747 (1973).
Moeller, H., et al., Chem. Abs. 82:170876a (1975) (abstract of Belgium 815,673).
Rolf, M., et al., Dyes and Pigments 5:189–207 (1984).

Primary Examiner—Johann Richter
Assistant Examiner—Fiona T. Powers
Attorney, Agent, or Firm—Connolly and Hutz

[57] ABSTRACT

Water-insoluble azo colorants, their preparation and use The invention relates to monoazo and disazo compounds of the formula (I)

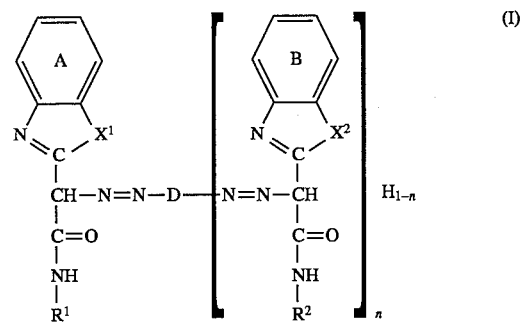

in which D is the radical of a carbocyclic or heterocyclic diazo or bisdiazo component, $R^1$ and $R^2$, independently of one another, are each a substituted or unsubstituted aryl or heteroaryl radical, $X^1$ and $X^2$, independently of one another, are each ring-forming ether oxygen or a substituted or unsubstituted imide grouping and n has the value 0 or 1, in which rings A and B, independently of one another, can each be additionally substituted and/or carry substituted or unsubstituted fused rings.

These new compounds of the formula (I) are obtained by coupling diazotized amines or diamines of the type $D-NH_2$ or $H_2N-D-NH_2$ with (benzoxazol-2-yl)- or (benzimidazol-2-yl)-arylacetamides.

Depending on the presence and length of alkyl chains, the compounds of the formula (I) are suitable for use as pigments, disperse dyes or oil-soluble dyes.

9 Claims, No Drawings

MONOAZO OR DISAZO PIGMENTS BASED ON (BENOXAZOL-2-YL)- OR (BENZIMIDAZOL-2-YL)-ARYLACETAMIDES

DESCRIPTION

Water-insoluble Azo Colorants, Their Preparation and Use

The present invention relates to new valuable compounds of the idealized general formula (I)

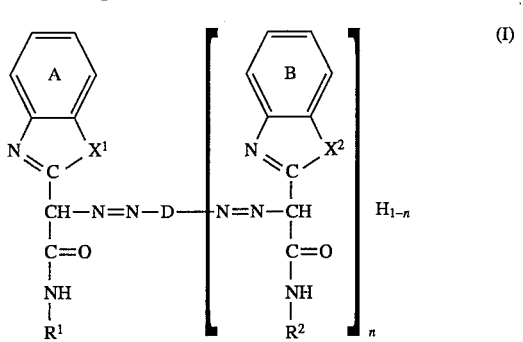

and mixtures thereof, in which

D is the radical of a diazo or bisdiazo component based on a carbocyclic or heterocyclic aromatic system, $R^1$ and $R^2$ independently of one another, are each a substituted or unsubstituted carbocyclic or heterocyclic aromatic radical, $X^1$ and $X^2$ independently of one another, are each a ring-forming —O— atom or a grouping of the formulae >NH or >$NR^3$, in which $R^3$ on the imide nitrogen is an aliphatic or aromatic radical, and n has the value 0 or 1, and in which rings A and B, independently of one another can each be additionally substituted and/or carry substituted or unsubstituted fused rings.

These compounds, classified in terms of their chemical structure principle in accordance with formula (I), are primarily monoazo compounds (n=0) and disazo compounds (n=1), in which, in the case where n is 0, the symbols D and $R^1$ and, in the case where n is 1, the symbols $R^1$ and $R^2$, independently of one another, are each a monovalent aromatic radical based on a compound from the benzene, naphthalene, biphenylene, fluorene or anthraquinone series, or based on a heterocyclic compound comprising one or more than one cyclic structural element(s) (linked to one another by condensation), and, in the case where n is 1, the symbol D is a bivalent aromatic radical based on a compound from the benzene, naphthalene, biphenylene, fluorene or anthraquinone series, or based on a heterocyclic compound comprising one or more than one cyclic structural element(s) (linked to one another by condensation) and these radicals D, $R^1$ and $R^2$, independently of one another, can each additionally carry substituents of, in most cases, nonionic character, $X^1$ and $X^2$ each have the meaning mentioned for them at the beginning, in which case $R^3$ on the imide nitrogen is a substituted or unsubstituted alkyl, aryl, aralkyl or acyl group, and wherein in these two cases which differ from one another because of their structural differences for n=0 or n=1, ring A or, independently of one another, rings A and B can each additionally carry substituents of, in most cases, nonionic character and/or similarly substituted or else unsubstituted fused rings.

According to the invention, of great interest are those azo colorants or mixtures derived therefrom in which in accordance with formula (I), in the case where n is 0, the symbols D and $R^1$ and, in the case where n is 1, the symbols $R^1$ and $R^2$, independently of one another, each comprise a substituted or unsubstituted aryl or heteroaryl radical from the following group: phenyl, phenyl containing 1 to 3 substituents, naphthyl or naphthyl containing 1 to 4 substituents, a monovalent radical based on biphenylene, fluorene or anthraquinone each of which can contain up to 4 substituents, and a monovalent radical based on a heterocyclic system composed of up to 5 fused aromatic rings, in which system at least one five- or six-membered cyclic structural element each containing 1 to 3 identical or different hetero atoms belonging thereto, mainly from the group comprising nitrogen, oxygen and sulfur, is incorporated and which can additionally contain a total of up to 4 substituents, these substituents on the aryl or heteroaryl radicals just mentioned having, independently of one another, the following meaning of $Z^1$ or $Z^2$, in which case $Z^1$ is a radical from the group comprising $C_1$–$C_{24}$-alkyl, $C_1$–$C_{24}$-hydroxyalkyl, $C_5$–$C_{10}$-cycloalkyl, $C_1$–$C_{24}$-alkenyl, $C_1$–$C_{24}$-alkoxy, $C_2$–$C_{25}$-alkoxycarbonyl (carbalkoxy), $C_2$–$C_{25}$-alkoxycarbonylamino, $C_2$–$C_{25}$-alkanoyl (acyl), $C_2$–$C_{25}$-alkanoyloxy (acyloxy), $C_2$–$C_{25}$-alkanoylamino (acylamino), carboxyl, $C_2$–$C_{13}$-carboxyalkyl, N-($C_1$–$C_{12}$-alkyl)amino, N,N-di-($C_1$–$C_{12}$-alkyl)amino, carbamoyl, N-($C_1$–$C_{12}$-alkyl)aminocarbonyl (alkylcarbamoyl), N,N-di-($C_1$–$C_{12}$-alkyl)aminocarbonyl (dialkylcarbamoyl), (aminocarbonyl)amino (ureido), $C_1$–$C_{12}$-alkylthio, $C_1$–$C_{24}$-alkylsulfonyl, sulfamoyl, N-($C_1$–$C_{12}$-alkyl)aminosulfonyl (alkylsulfamoyl), N,N-di-($C_1$–$C_{12}$-alkyl)aminosulfonyl (dialkylsulfamoyl), (aminosulfonyl)amino (sulfamido), sulfo, halogen, nitro, cyano, trifluoromethyl, hydroxyl and mercapto and saturated or unsaturated aliphatic components which may be present in the substituents $Z^1$ defined above of straight-chain or branched structure, and $Z^2$ is a radical of the formula Ar—W—, in which W is a direct bond or a bridge-forming grouping of the formulae —O—, —CO—, —CO—O—, —O—CO—, —CO—NH—, —NH—CO—, —S—, —SO—, —$SO_2$—, —$SO_2$—NH—, —NH—$SO_2$—, —($CH_2$)$_p$— (p=1–4), —CH($CH_3$)—, —C($CH_3$)$_2$—, —NR'— (in which R' is hydrogen or $C_1$–$C_6$-alkyl), —$CH_2$—NH— or —N=N— or a combination of at least 2 bivalent groupings of this type, and the Ar bound thereto is a monovalent radical based on a system of carbocyclic nature comprising up to 2 fused aromatic rings or on a system analogous thereto in which a five- or six-membered cyclic structural element having 1 to 3 identical or different hetero atoms belonging thereto, mainly from the group comprising nitrogen, oxygen and sulfur, is incorporated and which can have a total of 1 to 3 identical or different substituents of the type defined above for $Z^1$; and wherein, likewise with reference to formula (I), in the case where n is 1, the symbol D comprises a substituted or unsubstituted arylene or heteroarylene radical from the following group: phenylene, phenylene containing 1 to 3 substituents, naphthylene or naphthylene containing 1 to 4 substituents, a bivalent radical based on biphenylene, fluorene or anthraquinone each of which can contain up to 4 substituents, and a bivalent radical based on a heterocyclic system composed of up to 5 fused aromatic rings in which at least one five- or six-membered cyclic structural element each having 1 to 3 identical or different hetero atoms belonging thereto, mainly from the group comprising nitrogen, oxygen and sulfur, is incorporated and which can additionally contain a total of up to 4 substituents, these substituents on the arylene or heteroarylene radicals just mentioned having, independently of one another, the above meaning of $Z^1$ or $Z^2$ but furthermore also comprises a bivalent radical of the formula —Ar—V—Ar— in which V has the same meaning as the one given above for W as component of $Z^2$ or is a bridge-forming grouping of the formulae

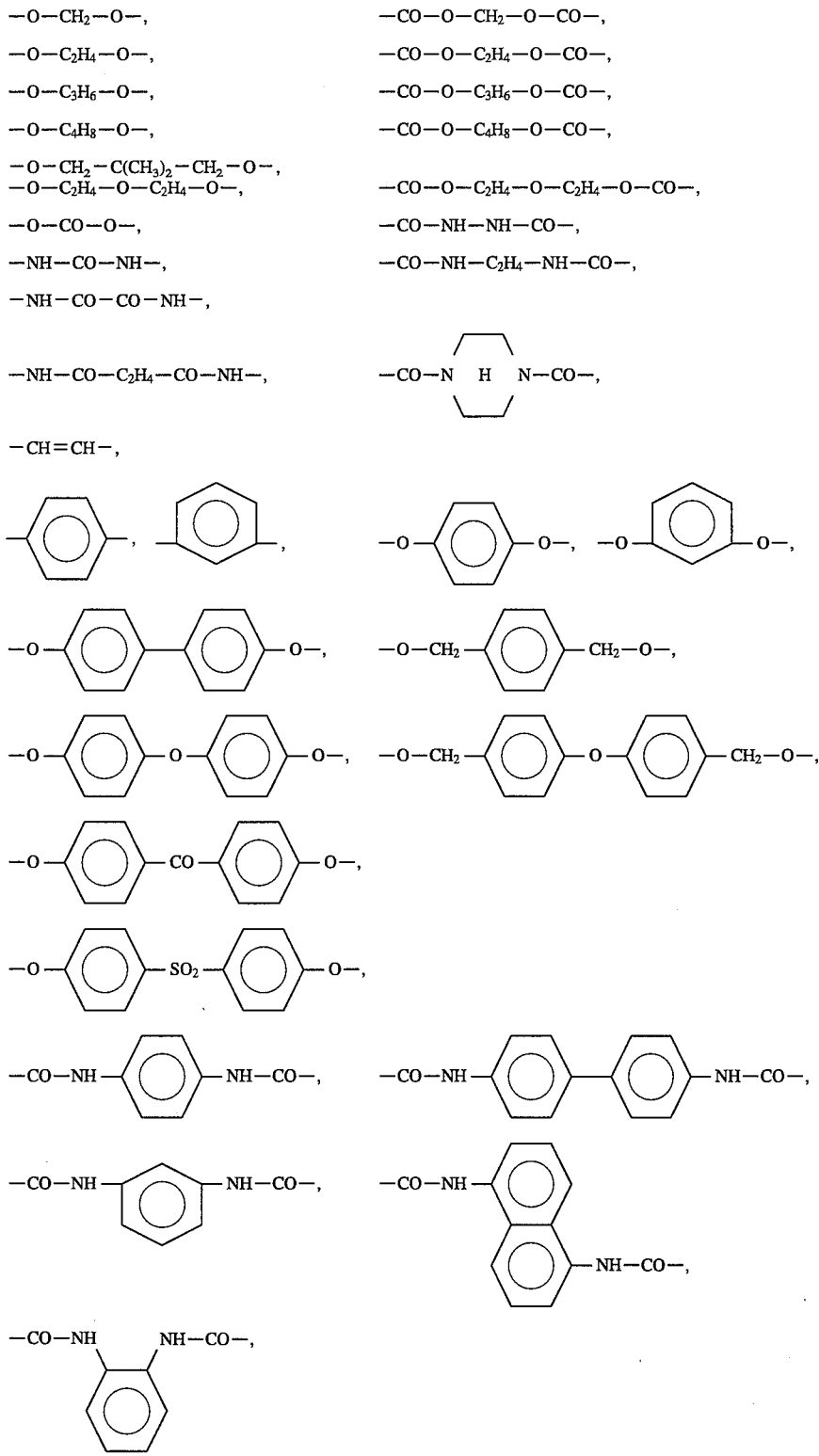

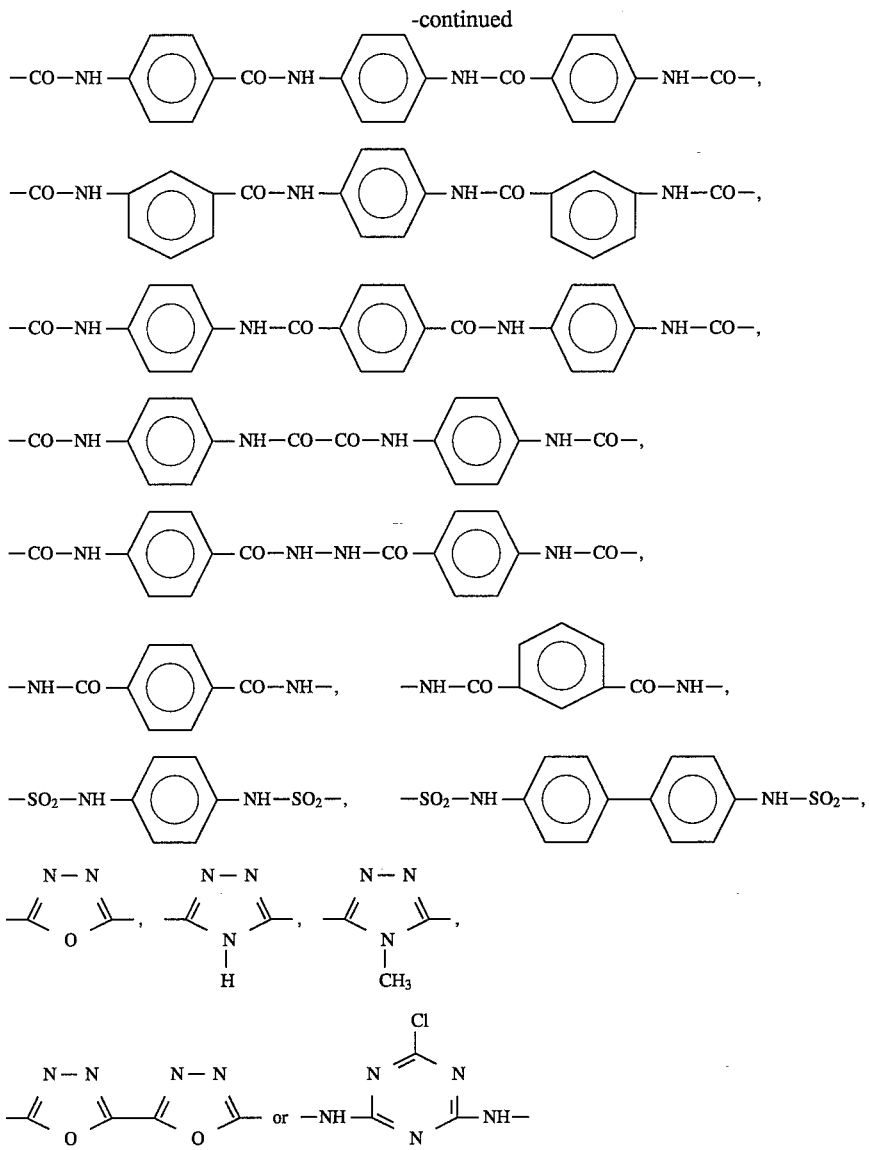

in which any arylene components which may be present in such a bridging member V can additionally contain a total of 1 to 4 identical or different substituents of the type defined above for $Z^1$, and the two Ars bound thereto are each, independently of one another, a bivalent radical based on an aromatic system which has the same meaning as the one given above for monovalent Ar.

In the context of the present invention, particular preference is given to those compounds of the formula (I) in which, if n is 0, the symbols D and $R^1$ and, if n is 1, the symbols $R^1$ and $R^2$, independently of one another, each comprise an aryl or heteroaryl radical from the following group: phenyl, phenyl containing 1 to 3 substituents, naphthyl, naphthyl containing 1 to 3 substituents, or biphenylyl, a monovalent radical based on biphenylene, fluorine or anthraquinone each of which can contain 1 to 3 substituents, and a monovalent radical based on a monocyclic or polycyclic heterocyclic system composed of 2 or 3 benzo-fused aromatic rings in which 1 or 2 nitrogen-containing five- or six-membered cyclic structural elements having a total of up to 4, at most 3 per individual ring, identical or different hetero atoms belonging thereto, mainly from the group comprising up to 3 nitrogen, nitrogen/sulfur and sulfur/ oxygen, if desired also 2 five- and/or six-membered heterocycles fused with one another, are incorporated, such as, for example, based on benzimidazole, benzimidazol-2-one, benzimidazole-2-thione, benzoxazole, benzoxazol-2-one, benzothiazole, benzothiazol-2-one, indazole, benzotriazole, indole, isoindole, phthalimide, phthalimid-2-one, naphthalimide, naphthalimid-2-one, thiazole, isothiazole, 1,2,4-thiadiazole, 1,3,4-thiadiazole, thiophene, thionaphthene, quinoline, quinolin2-one, quinoline-2,4-dione, isoquinoline, cinnoline, quinazoline, quinazolin-4-one, quinazoline-2,4-dione, phthalazine, phthalazine-1,4-dione, quinoxaline, quinoxaline-2,3-dione, carbazole, phenazine, benzimidazo[1,2-a]pyrimid-2-one, benzo[e][1,3]oxazine-2,4-dione, benzo[e][1,4]oxazin-3-one, benzo[cd]indol-2-one, benzo[de]isoquinoline-1,3-dione and dibenzo[a,c]phenazine, and which can additionally contain, not only on the heterocyclic but also on the benzo-fused components, in each case 1 to 3, but a total of at most 4 substituents, those substituents on the aryl or heteroaryl radicals just mentioned, independently of one another, having the meaning of $Z^1$ or $Z^2$ given below and primarily having nonionic character.

From the above list of heterocyclic systems suitable as component D, $R^1$ or $R^2$ in the compounds of formula (I), the following have proven to be particularly suitable: benzothiazole, benzimidazole, benzimidazol-2-one, quinolin-2-one, quinazoline-2,4-dione, carbazole, benzoxazol-2-one, phthalimide, quinoxaline-2,3-dione and phthalazine-1,4-dione.

Of the substituents $Z^1$ and $Z^2$ on the aryl and heteroaryl radicals classified above as favorable which are considered for inclusion in the short list at this point, $Z^1$ is preferably a radical from the group comprising $C_1$–$C_4$-alkyl, such as, for example, methyl, ethyl, propyl, isopropyl, butyl, isobutyl, 2-butyl or 2-methylprop-2-yl, in particular methyl and ethyl, $C_1$–$C_4$-alkoxy, such as, for example, methoxy, ethoxy, propoxy, isopropoxy, butoxy, isobutoxy, 2-butoxy or tert.-butoxy, in particular methoxy and ethoxy, $C_2$$C_5$-alkoxycarbonyl, $C_2$–$C_5$-alkanoyloxy, $C_2$–$C_5$-alkanoylamino, carboxyl, carbamoyl, N-($C_1$–$C_4$-alkyl)aminocarbonyl, N,N-di-($C_1$–$C_4$-alkyl)aminocarbonyl, $C_1$–$C_4$-alkylsulfonyl, sulfamoyl, N-($C_1$–$C_4$-alkyl)aminosulfonyl, N,N-di-($C_1$–$C_4$-alkyl)aminosulfonyl, sulfo, chlorine, bromine, nitro, cyano, trifluoromethyl and hydroxyl, and $Z^2$ is a radical of the formula Ar—W—, in which W is a direct bond or, preferably, a bridge-forming grouping of the formulae —O—, —CO—O—, —O—CO—, —CO—NH—, —NH—CO—, —S—, —$SO_2$—, —$SO_2$—NH—, —NH—$SO_2$—, —$CH_2$—, $CH_2$—$CH_2$—, —NH—, —NH—$CH_2$— or —N=N— or a combination of at least 2 bivalent groupings of this type, and the Ar bound thereto is phenyl, naphthyl or phenyl together with the fused-on five- or six-membered nitrogen-containing aromatic ring having 1 or 2 identical or different hetero atoms belonging thereto, in particular only nitrogen or nitrogen/sulfur, or such a monovalent aryl or heteroaryl radical Ar additionally containing 1 to 3, usually only up to 2, identical or different substituents of the type defined above for $Z^1$.

Within the above list of the compounds of the formula (I) considered according to the invention as advantageous, the symbol D comprises, if n is 1, an arylene or heteroarylene radical from the following group: phenylene, phenylene containing 1 to 3 substituents, naphthylene, naphthylene containing 1 to 3 substituents, or biphenyldiyl, a bivalent radical based on biphenylene, fluorene or anthraquinone each of which can contain 1 to 3 substituents, and a bivalent radical based on a monocyclic or polycyclic heterocyclic system composed of 2 or 3 benzo-fused aromatic rings, in which 1 or 2 nitrogen-containing, five- or six-membered cyclic structural elements having a total of up to 4, at most 3 per individual ring, identical or different hetero atoms belonging thereto, mainly from the group comprising up to 3 nitrogen, nitrogen/sulfur and sulfur/oxygen, if desired also 2 five- and/or six-membered heterocycles fused with one another, are incorporated, such as, for example, based on benzimidazole, benzimidazol-2-one, benzoxazole, benzothiazole, benzotriazole, phthalimide, quinoline, isoquinoline, quinazoline, quinazolin-4-one, quinoxaline, quinoxaline-2,3-dione, thionaphthene, carbazole, 2,2'-bipyridine, benzo[e][1,3]-oxazine-2,4-dione, dibenzo[b,d]thiophene 5,5-dioxide, thioxanthene 10,10-dioxide, pyrrolo[3,4-f]isoindole1,3,5,7-tetraone, 5H-phenanthridin-6-one and 4,9-dihydropyrido[2,3,4,5-lmn]phenanthridine-5,10-dione, and which can additionally contain, not only on the heterocyclic but also on the benzo-fused components, in each case 1 to 3, but a total of at most 4 substituents, these substituents on the arylene or heteroarylene radicals just mentioned, independently of one another, each having the above meaning of $Z^1$ or $Z^2$ and primarily having nonionic character, or a combination of two heterocyclic radicals of this type bound to one another by a single bond or one of them bound to phenylene, but furthermore also a bivalent radical of the formula —Ar—V—Ar—, in which V has the same meaning as the one given above for W as component of $Z^2$ or is a bridge-forming grouping of the formulae

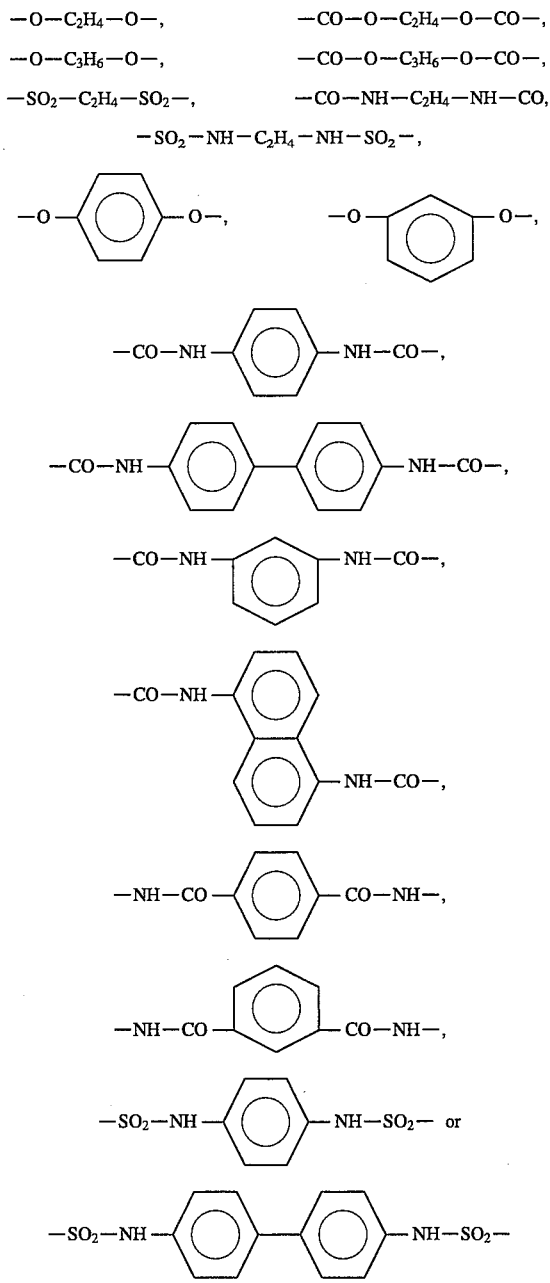

in which any arylene components which may be present in such a bridging member V can additionally contain a total of 1 to 4, usually only up to 2, identical or different substituents of the type defined above for $Z^1$ and the two Ars bound thereto are both, independently of one another, a bivalent aromatic radical based on one of the same specific ring systems given above for monovalent Ar.

A further possibility of defining the compounds according to the invention of the formula (I) more precisely is shown by the heterocyclic structural elements fused with the benzenoid rings A and B in that, on the one hand, $R^3$ on the ring-forming imide nitrogen [lacuna], if $X^1$ or $X^2$ is a substituted imide grouping >$NR^3$, a radical from the group comprising $C_1$—$C_{18}$-alkyl or $C_2$–$C_5$-alkanoyl, aryl, aralkyl or aroyl each having 1 or 2 five- or six-membered ring structure(s) present therein, but in particular a radical from the group comprising $C_1$–$C_4$-alkyl, acetyl, phenyl, naphthyl, benzyl or benzoyl, in which any ring structures present can each additionally contain 1 to 2 nonionic substituents; and in that, on the other hand, the benzo-fused rings A and B are both unsubstituted or contain 1 to 4 identical or different substituents having the meaning of $Z^1$ or $Z^2$, but usually only up to 2 substituents of the $Z^1$ type, and/or rings A and B can furthermore carry fused carbocyclic rings, for example with the formation of a naphtho radical, which, if desired, can additionally contain substituents belonging to the $Z^1$ type.

Owing to their immediate practical importance, very particular attention in the context of the invention is given to those colorants of the formula (I) in which the index n has the value 0 and the ring-forming hetero component $X^1$ is ether-like bound oxygen —O— or an unsubstituted imide grouping >NH, i.e. the corresponding monoazo compounds.

The general formula (I) of the azo colorants according to the invention is understood to mean an idealized formula and also comprises the corresponding tautomeric compounds and the possible configurational isomers of each tautomeric form. The idealized formula (I) used for illustrating the structural relationships therefore also includes in particular the hydrazone and bishydrazone form.

The invention also relates to the process for the preparation of the compounds according to the invention of the idealized general formula (I) and mixtures thereof, characterised in that one or more different amines of the formula D—$NH_2$ or diamines of the formula $H_2N$—D—$NH_2$, in which the symbol D has in each case, in accordance with formula (I), the meaning apparent from the above descriptions, is/are diazotized and reacted by coupling with 1 equivalent of a compound of the general formula (II)

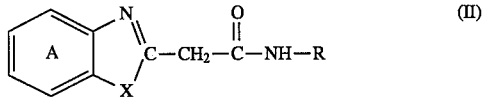

or a mixture of a plurality of different compounds of the formula (II) per equivalent of the total number of reacting diazonium groupings, in which the symbols X and R in formula (II) have the same meaning, in accordance with formula (I), as the one for the symbols $X^1$ and $X^2$ and $R^1$ and $R^2$ apparent in each case from the above descriptions and the ring A can be fused or substituted in the same manner as indicated there for rings A and B.

Diazo components which are suitable for the process according to the invention are diazotizable aromatic amines of the formula D—$NH_2$, in particular anilines, naphthylamines, aminobiphenylenes, aminofluorenes, aminoanthraquinones and heterocyclic amines, it being possible for each of these primary amines to be mono- or polysubstituted. Starting materials of this type for producing monoazo compounds (n=0) of the formula (I) include in particular aromatic amines D—$NH_2$ in which the symbol D is one of the aryl or heteroaryl radicals characterized above by name.

Examples of aromatic amines of the abovementioned type include aniline and substituted anilines, preferably aniline containing 1 to 3 substituents from the group comprising lower alkyl, such as methyl or ethyl; lower alkoxy, such as methoxy or ethoxy; phenoxy; carboxyl; carbalkoxy, such as carbomethoxy, carboethoxy, carbopropoxy, carboisopropoxy or carbobutoxy; acyl, such as acetyl or benzoyl; acyloxy, such as acetoxy; acylamino, such as acetylamino or benzoylamino; unsubstituted or N-mono- or N,N-disubstituted carbamoyl or sulfamoyl, suitable substituents being again lower alkyl or unsubstituted or mono- or polysubstituted phenyl; alkyl- or phenylamino; alkyl- or phenylsulfonyl; phenylsulfonylamino; substituted or unsubstituted phenylazo; sulfo; cyano; halogen, such as chlorine or bromine; nitro, hydroxyl and trifluoromethyl; furthermore aminobiphenyl and derivatives thereof ring-substituted by up to 4 of the abovementioned radicals.

Examples of suitable specifically substituted anilines are 2-, 3- and 4-nitroaniline, -chloroaniline, -methylaniline, -ethylaniline, -trifluoromethylaniline or -methoxyaniline; 2,3-, 2,4-, 2,5-, 2,6-, 3,4- and 3,5-dinitroaniline or -dichloroaniline, 4-chloro-2-nitroaniline, 4-methyl-2-nitroaniline or 4-methoxy-2-nitroaniline; 5-chloro-2-nitroaniline, 5-methyl-2-nitroaniline or 5-methoxy-2-nitroaniline; 2-chloro-4-nitroaniline, 2-methyl-4-nitroaniline or 2-methoxy-4-nitroaniline; 2-chloro-5-nitroaniline, 2-methyl-5-nitroaniline or 2-methoxy-5-nitroaniline; 2-chloro-4-methylaniline or 2-chloro-4-methoxyaniline; 2-chloro-5-methylaniline, 2-chloro-5-methoxyaniline or 2-chloro-5-trifluoromethylaniline; 3-chloro-2-methylaniline or 3-chloro-2-methoxyaniline; 4-chloro-2-methylaniline, 4-chloro-2-methoxyaniline, 4-chloro-2,5-dimethylaniline or 4-chloro-2-trifluoromethylaniline; 5-chloro-3-methylaniline, 5-chloro-3-methoxyaniline, 5-chloro-2-phenoxyaniline or 5-chloro-2-(4-chlorophenoxy)aniline; 2,4,5-, 2,3,4-, 2,3,5-, 2,4,6-, 2,3,6- and 3,4,5-trichloroaniline; 4-phenoxyaniline; 3,5-bis(trifluoromethyl)aniline; 5-methyl-2-methoxyaniline; 4-phenylazoaniline; 4-(2-methylphenylazo)aniline, 2,5-dimethoxy-4-(4-nitrophenylazo)aniline, 4-(2,6-dichloro-4-nitrophenylazo)-2,5-dimethoxyaniline, 2-(2-chloro-4-nitrophenylazo)-5-methoxy-4-methylaniline, 4-(2-methylphenylazo)-2-methylaniline, 4-(3-methylphenylazo)-3-methylaniline or 4-(4-methyl-2-nitrophenylazo)-2-methoxy-5-methylaniline; 4-phenylaminoaniline, 2-methoxy-4-phenylaminoaniline or 4-(4-methoxyphenylamino)aniline; 4-acetylaminoaniline or 2-chloro-4-methyl-5-acetylaminoaniline; 4-benzoylamino-2,5-dimethoxyaniline, 4-benzoylamino-2-chloro-5-methoxyaniline, 4-benzoylamino-2-methoxy-5-methylaniline or 5-benzoylamino-2,4-dimethylaniline; 4-cyano-2,5-dimethoxyaniline or 2-chloro-4-cyano-5-methylaniline; 2-, 3- and 4-aminobenzoic acid; methyl 2-, 3- and 4-aminobenzoate, ethyl 2-, 3- and 4-aminobenzoate, propyl 2-, 3- and 4-aminobenzoate or butyl 2-, 3- and 4-aminobenzoate, in particular dimethyl 2-aminobenzene-1,4-dicarboxylate or diethyl 2-aminobenzene-1,4-dicarboxylate (aminoterephthalic ester), furthermore dimethyl 5-aminobenzene-1,3-dicarboxylate or diethyl 5-aminobenzene-1,3-dicarboxylate (aminoisophthalic ester); 2-, 3- and 4-aminobenzamide; 3-aminobenzamide substituted in the 4 position by chlorine, methyl, methoxy or carbomethoxy, or 4-aminobenzamide substituted in the 3 position by chlorine, methyl, methoxy or carbomethoxy, and derivatives of the above benzamides substituted on the amide nitrogen atom by methyl, ethyl, phenyl, methylphenyl or dimethylphenyl, preferably 2,4-dimethylphenyl, chloro- and dichlorophenyl, in particular 4-chlorophenyl and 2,5-dichlorophenyl, 2-, 3- and 4-carbamoylphenyl, methoxyphenyl, benzothiazol-2-yl or benzimidazol-2-on-5-yl, such as 3-amino-4-chlorobenzamide, 3-amino-4-methylbenzamide, 3-amino-4-methyl-N-methylbenzamide, 3-amino-4-methoxybenzanilide, 3-amino-N-(2,5-dichlorophenyl)-4-methoxycarbonylbenzamide, 3-amino-N-(4-carbamoylphenyl)-4-methoxybenzamide, 3-amino-4-methyl-N-(4-sulfophenyl)benzamide, 4-amino-2,5-dimethoxy-N-(2,4-dimethylphenyl)benzamide, 4-amino-N-(2,4-dihydroxyquinazolin-6-yl)benzamide and 4-amino-N-(6-chlorobenzothiazol-2-yl)benzamide;
2-phenylsulfonylaniline, 2-ethylsulfonyl-5-trifluoromethylaniline, 5-ethylsulfonyl-2-methoxyaniline and 5-benzylsulfonyl-2-methoxyaniline; 2-, 3- and 4-aminobenzenesulfonic acid, 2-aminobenzene-1,4-disulfonic acid, 2-amino-4-methylbenzenesulfonic acid, 2-amino-4-chloro-5-methylbenzenesulfonic acid, 2-amino-5-chloro-4-methylbenzenesulfonic acid and 2-amino-5-chloro-4-carboxybenzenesulfonic acid; 2-, 3- and 4-aminobenzenesulfonamide; 4-amino-3-methoxybenzenesulfonamide, 4-amino-2,5-dimethoxybenzenesulfonamide and 4-amino-2-methoxy-5-methylbenzenesulfonamide, and derivatives of the above benzenesulfonamides substituted on the amide nitrogen atom by methyl, ethyl, phenyl, chlorophenyl, dichlorophenyl, methylphenyl, dimethylphenyl or methoxyphenyl, such as 3-amino-N,N-diethyl-4-methoxybenzenesulfonamide, 3-amino-N-butyl-4-methoxybenzenesulfonamide, 3-amino-N,N-dimethyl-2-methylbenzenesulfonamide, 4-amino-2,5-dimethoxybenzenesulfanilide, 4-amino-2,5-dimethoxy-N-methylbenzenesulfonamide, 4-amino-2-methoxy-5-methyl-N-methylbenzenesulfonamide and 5-amino-2-methylbenzenesulfanilide.

Suitable aromatic amines also include naphthylamines and substituted naphthylamines, such as, for example, 1-naphthylamine and 2-naphthylamine, 4-chloro-1-naphthylamine, 4-nitro-1-naphthylamine, 2- or 4-methyl-1-naphthylamine, 2- or 4-methoxy-1-naphthylamine, 2- or 4-ethoxy-1-naphthylamine, 4-(2-methoxyphenylazo)naphthylamine and 4-(2-ethoxyphenylazo)naphthylamine; furthermore aminobiphenylenes and aminofluorenes, such as, for example, 2-aminofluorene; furthermore aminoanthraquinones, such as, for example, 1-aminoanthraquinone and 2-aminoanthraquinone, and substituted aminoanthraquinones, such as, for example, 1-amino-2-chloroanthraquinone, 1-amino-3-chloroanthraquinone, 1-amino-4-chloroanthraquinone, 1-amino-5-chloroanthraquinone, 1-amino-6-chloroanthraquinone, 1-amino-5,8-dichloroanthraquinone, 1-amino-6,7-dichloroanthraquinone, 1-amino-2-bromoanthraquinone, 1-amino-3-bromoanthraquinone, 1-amino-2,4-dibromoanthraquinone, 1-amino-6-fluoroanthraquinone, 1-amino-7-fluoroanthraquinone, 1-amino-6,7-difluoroanthraquinone, 2-amino-1-chloroanthraquinone, 2-amino-3-chloroanthraquinone, 2-amino-3-bromoanthraquinone, 1-amino-4-nitroanthraquinone, 1-amino-5-nitroanthraquinone, 1-amino-2-methylanthraquinone, 1-amino-2-methyl-4-chloroanthraquinone, 1-amino-2-methyl-4-bromoanthraquinone, 1-aminoanthraquinone-2-carboxylic acid, 1-aminoanthraquinone-2-carboxamide, methyl 1-aminoanthraquinone-2-carboxylate, 1-amino-4-nitroanthraquinone-2-carboxylic acid, 1-amino-2-acetylanthraquinone, 1-amino-4-acetylaminoanthraquinone, 1-amino-5-acetylaminoanthraquinone, 1-amino-5-benzoylaminoanthraquinone, 1-amino-4-benzoylaminoanthraquinone, 1-amino-8-benzoylaminoanthraquinone, 1-amino-4-hydroxyanthraquinone, 1-amino-5-hydroxyanthraquinone, 1-amino-4-methoxyanthraquinone, 1-amino-2-methoxy-4-hydroxyanthraquinone, 1-amino-4-methylaminoanthraquinone, 1-amino-4-benzylaminoanthraquinone, 1-amino-4-cyclohexylaminoanthraquinone, 1-amino-4-anilinoanthraquinone, 1-amino-2-bromo-4-methylthioanthraquinone, 1-amino-4-(4-methylphenylsulfonylamino)-2-phenylthioanthraquinone and 1-amino-6-methylthioanthraquinone.

Further suitable aromatic amines are those based on heterocyclic structures and substitution products thereof, such as, for example, 4-amino-6-chlorobenzimidazole and 4-amino-6-chloro-2-methylbenzimidazole, 5-amino-2-acetamidobenzimidazole and 5-amino-2-carbomethoxyaminobenzimidazole, 5-aminobenzimidazol-2-one which is unsubstituted or substituted in the 6 position by chlorine, bromine, nitro, methoxy, ethoxy, carboxyl, carboxymethyl, carboxyethyl or carboxybutyl, 5-aminobenzimidazol-2-one which is unsubstituted or substituted in the 7 position by chlorine, bromine, methyl, ethyl, methoxy or ethoxy, in particular 5-amino-1-methylbenzimidazol-2-one, 5-amino-6-methylbenzimidazol-2-one, 5-amino-4,6-dichlorobenzimidazol-2-one, 5-amino-4,6,7-trichlorobenzimidazol-2-one, 6-amino-4-chloro-5-nitrobenzimidazol-2-one and 7-amino-5-chloro-1-methylbenzimidazol-2-one, and 5-amino-6-methylbenzimidazole-2-thione; 5-amino-7-chlorobenzoxazol-2-one and 6-amino-5-chlorobenzoxazol-2-one; 2-amino-6-methoxybenzothiazole, 2-amino-6-ethoxybenzothiazole, 2-amino-6-nitrobenzothiazole, 6-aminobenzothiazole, 6-amino-2-acetamidobenzothiazole and 6-aminobenzothiazol-2-one; 3-amino-6-chloroindazole, 5-aminoindazole and 6-aminoindazole; 5-aminophthalimide and 3-amino-1,8-naphthalimide; 5-amino-2-(2-hydroxyphenyl)benzotriazole; 6-amino-2-hydroxy-4-methylquinoline, which can be additionally substituted by 5-methyl-, 7-chloro-, 7-methyl, 7-ethoxy, 8-methyl, 8-methoxy or 8-carboxymethyl, in particular 6-amino-5-chloro-4,8-dimethyl-2-hydroxyquinoline, 6-amino-8-chloro-4,5-dimethyl-2-hydroxyquinoline, 6-amino-5,8-dimethoxy-4-methyl-2-hydroxyquinoline, 6-amino-5-chloro-4-methyl-8-methoxy-2-hydroxyquinoline, 6-amino-4,5,8-trimethyl-2-hydroxyquinoline and 6-amino-5,8-dimethyl-2-hydroxyquinoline, 7-aminoquinoline, 7-amino-2-hydroxyquinoline, 7-amino-2-hydroxy-4-methylquinoline, which can be additionally substituted by 6-nitro, 6-sulfo, 6-methoxy, 6-isopropoxy, 6-butoxy, 6-methyl or 6-chloro, 5-chloro or 5-methyl, in particular 7-amino-2-hydroxy-4-methylquinoline and 7-amino-2-hydroxy-4-methyl-6-methoxyquinoline; 6-amino-2-methylquinazolin-4-one, 6-aminoquinazoline-2,4-dione, 6-amino-3-methylquinazoline-2,4-dione, 6-amino-7-nitroquinazoline-2,4-dione, 6-amino-7-chloroquinazoline-2,4-dione, 6-amino-8-nitroquinazoline-2,4-dione, 7-aminoquinazoline-2,4-dione and 7-amino-6-nitroquinazoline-2,4-dione; 6-aminophthalazine-1,4-dione; 6-aminoquinoxaline-2,3-dione, which is unsubstituted or substituted in the 7 position by chlorine, nitro, methyl, methoxy, ethoxy or carboxyl, in particular 6-amino-5,7-dichloroquinoxaline-2,3-dione and 6-amino-5,7,8-trichloroquinoxaline-2,3-dione, 7-amino-5-chloroquinoxaline-2,3-dione and 8-amino-6-chloro-1-methylquinoxaline-2,3-dione; finally 2-aminocarbazole and aminobenzo[c,d]indol-2-one, 7(8)-amino-4-methylbenzimidazo[1,2-a]pyrimid-2-one, 6- or 7-aminobenzo[e][1,3]-oxazine-2,4-dione, 6(7)-amino-3-phenylbenzo[e][1,3]-oxazine-2,4-dione, 7-aminobenzo[e][1,4]oxazin-3-one and 11-aminodibenzo[a,c]phenazine.

Suitable bisdiazo components for the process according to the invention are diazotizable aromatic diamines of the formula $H_2N-D-NH_2$, in particular phenylenediamines, naphthylenediamines, diaminobiphenylenes, diaminofluorenes, diaminoanthraquinones, benzidines and heterocyclic aromatic diamines, which primary diamines may each be monosubstituted or polysubstituted. Such starting materials for producing disazo compounds (n=1) of formula (I) include in particular aromatic diamines $H_2N-D-NH_2$ in which the symbol D denotes one of the arylene or heteroarylene radicals named above.

Examples of suitable specific aromatic diamines $H_2N-D-NH_2$ are p-phenylenediamine, m-phenylenediamine, 2-chloro-p-phenylenediamine, 2-methyl-p-phenylenediamine, 2-methoxy-p-phenylenediamine, 2-nitro-p-phenylenediamine, 2,5-dichloro-p-phenylenediamine, 2,5-dimethyl-p-phenylenediamine, 2,5-dimethoxy-p- phenylenediamine, 2,5-diaminobenzotrifluoride, methyl 2,5-diaminobenzoate, 3,5-diamino-4-chlorobenzenesulfonic acid, 1,5-diaminonaphthalene, 1,4-diaminoanthraquinone, benzidine, 3,3',5,5'-tetrachlorobenzidine, 2,2',5,5'-tetrachlorobenzidine, 2,2'-dichloro-3,3'-dimethylbenzidine, 2,2'-dimethoxybenzidine, 2,2'-dichlorobenzidine, 2,2'-dimethylbenzidine, 5,5'-dimethoxy-2,2'-dinitrobenzidine, 5,5'-dimethyl-2,2'-difluorobenzidine, 2,2'-dichloro-5,5'-dimethoxybenzidine, 5,5'-dichloro-2,2'-dimethylbenzidine, 2,2'-dichloro-5,5'-dinitrobenzidine, 2,2'-dinitrobenzidine, 3,3'-dimethoxybenzidine, 3,3'-dinitrobenzidine, 3,3'-diethoxybenzidine, 3,3'-dimethylbenzidine, 3,3'-dichlorobenzidine, 3,3'-diphenoxybenzidine, 3,3'-diisopropylbenzidine, 3,3'-di(2-methoxyethoxy)benzidine, 3,3'-diethylbenzidine, 3,3'-di-n-butoxybenzidine, 3,3'-dipropoxybenzidine, 3,3'-di(2-methylpropoxy)benzidine, 3,3'-diisopropoxybenzidine, 3,3'-di-n-butylbenzidine, 3,3'-di(2-methylpropyl)benzidine, 3,3'-dipropylbenzidine, benzidine-3,3'-dicarboxylic acid, diethyl benzidine-3,3'-dicarboxylate, dibutyl benzidine-3,3'-dicarboxylate, dimethyl benzidine-3,3'-dicarboxylate, 2,5-diaminodiphenyl sulfone and 5,5'-diamino-2,2'-bipyridine, and the following heterocyclic diamines which are reproduced by the structural formula and correspond to the general structural principle H₂N—Ar—V—Ar—NH₂:

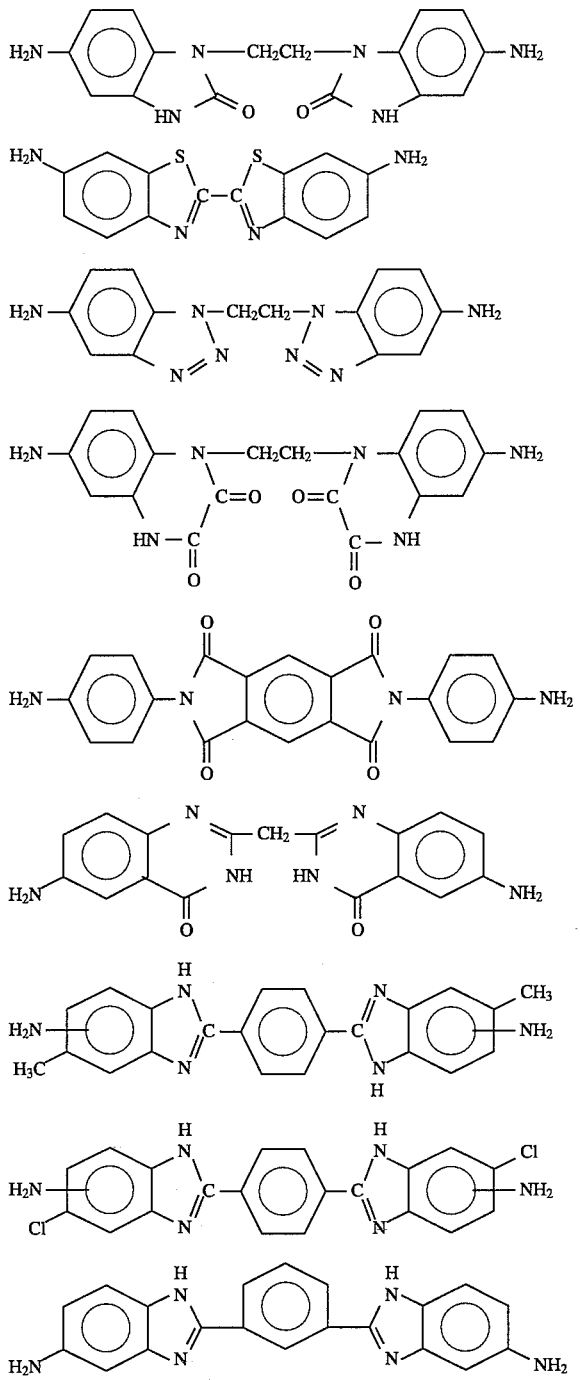

-continued
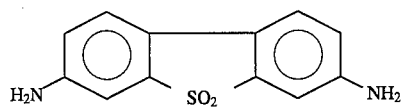
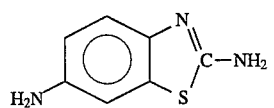
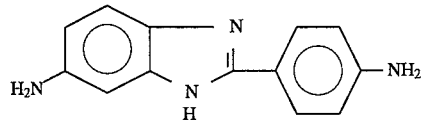
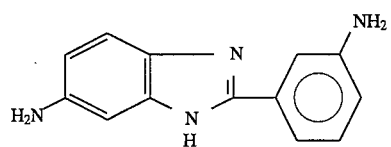
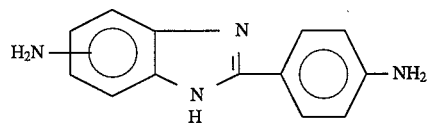
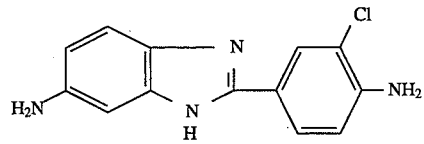
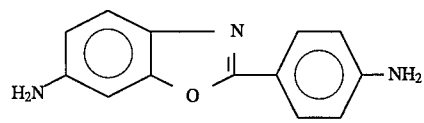
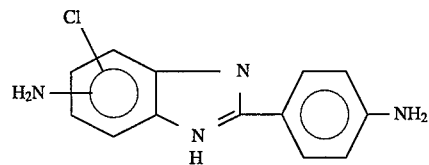
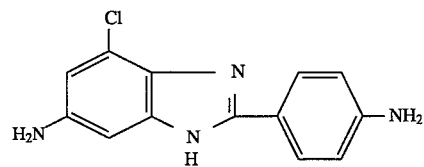
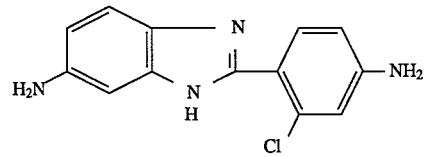
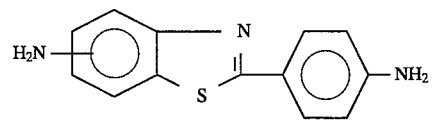
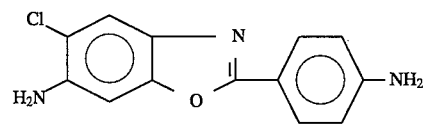

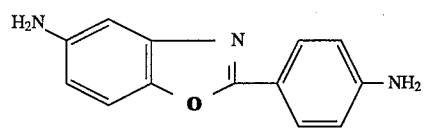
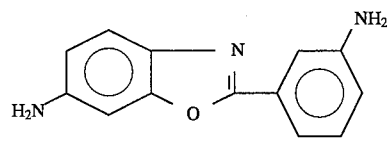
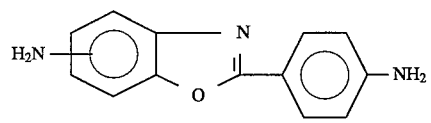
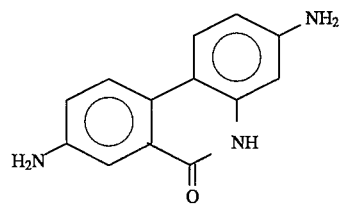
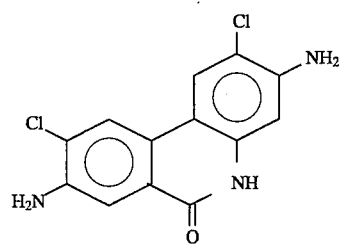
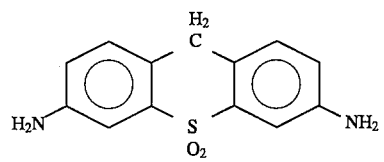
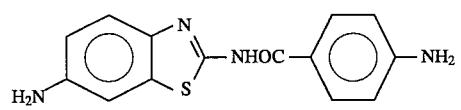
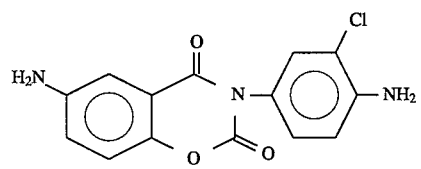
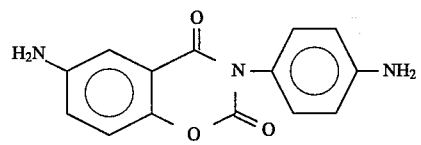
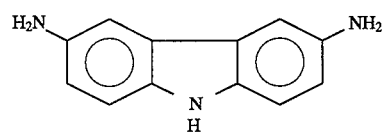

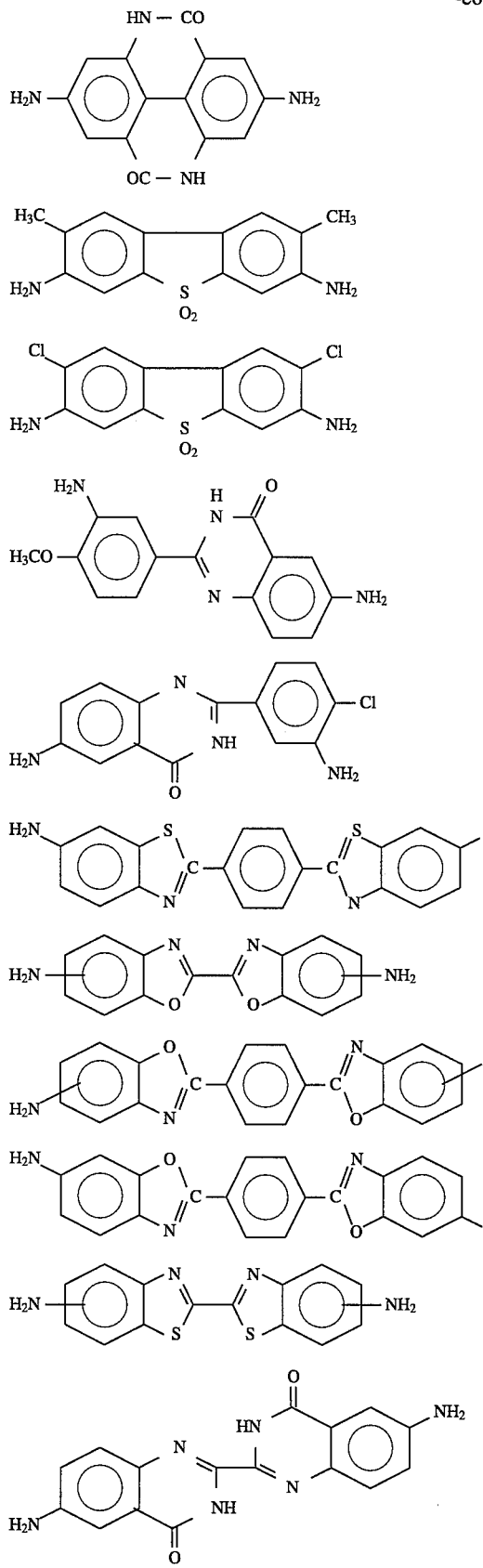

-continued
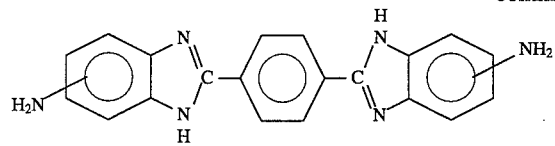
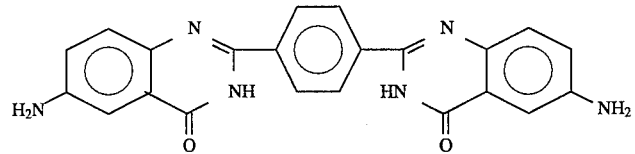
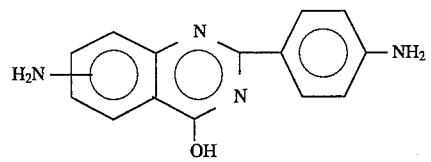
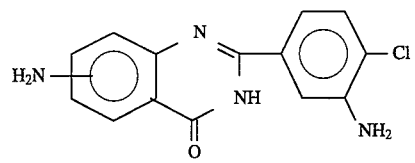
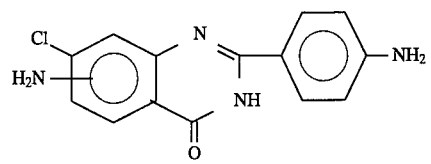
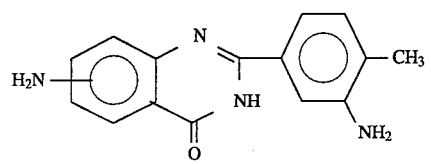
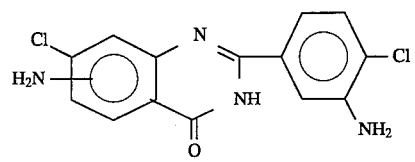
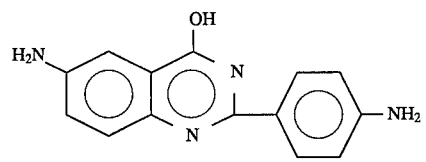
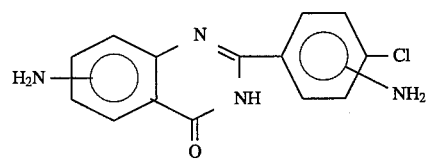
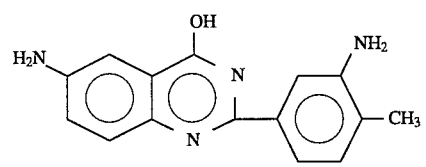

-continued
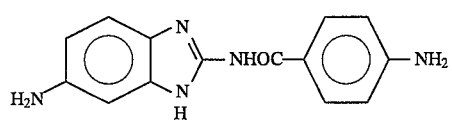
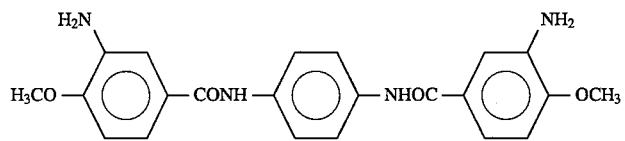
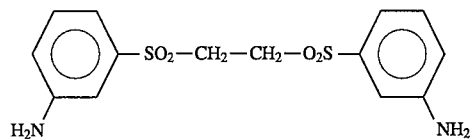
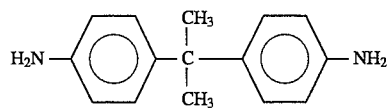
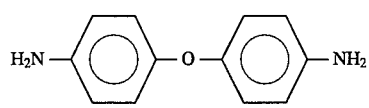
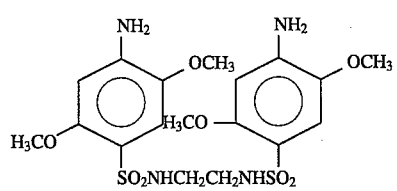
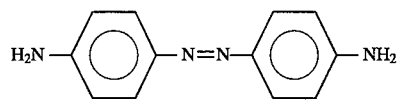
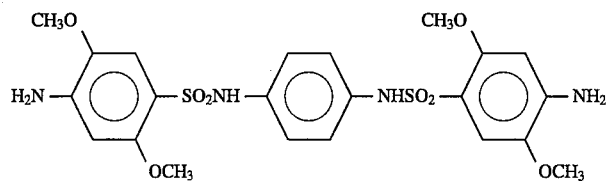
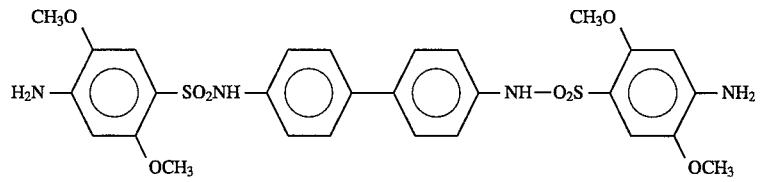
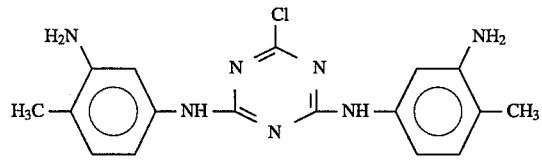
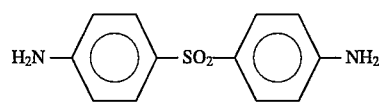
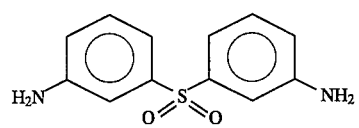

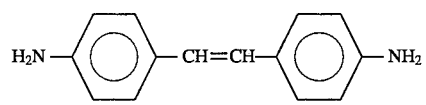
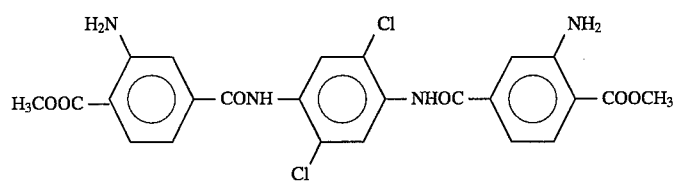
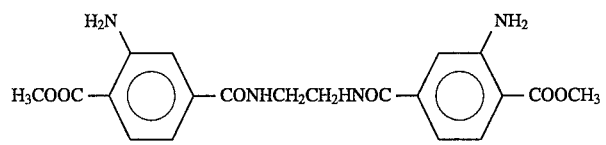
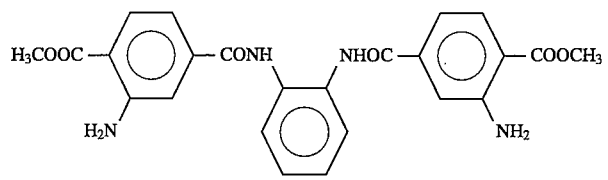
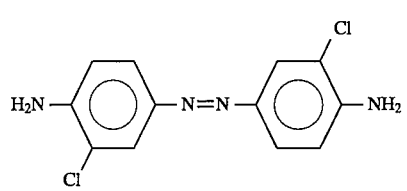
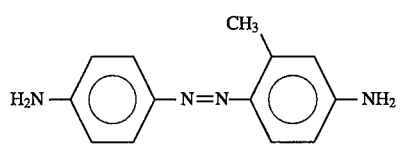
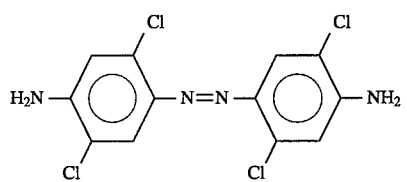
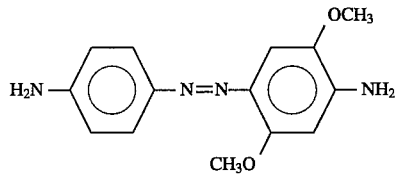
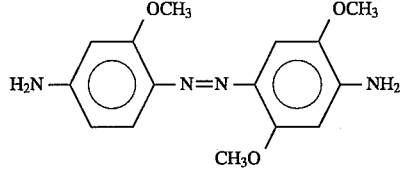
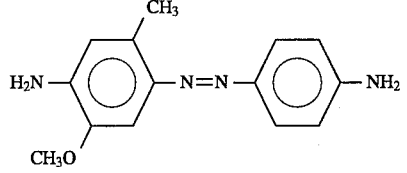

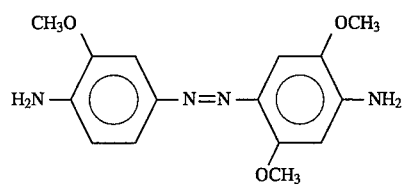
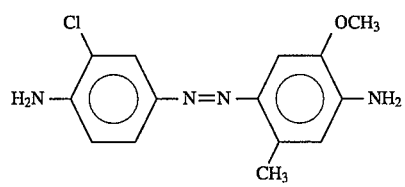
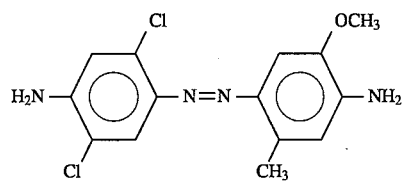
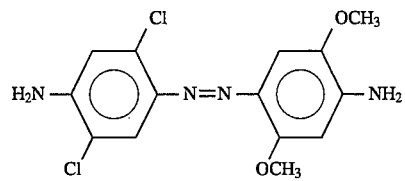
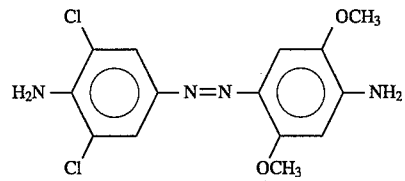
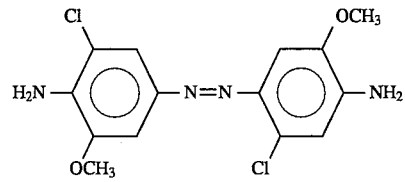
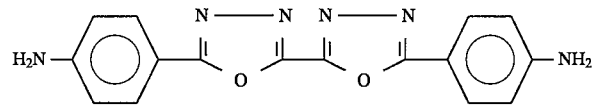
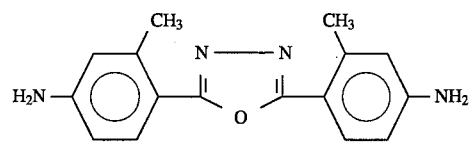
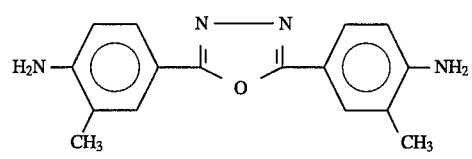
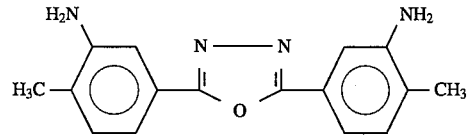

-continued
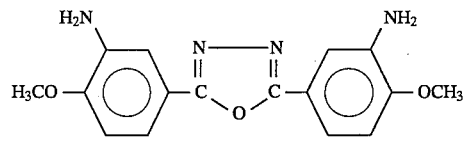
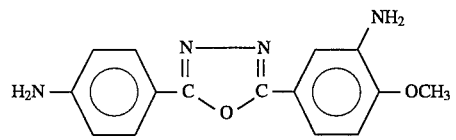
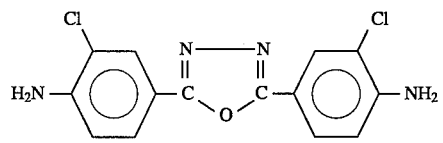
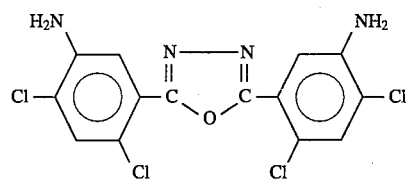
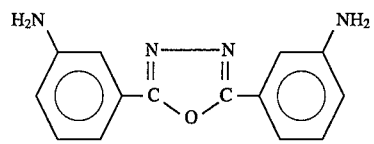
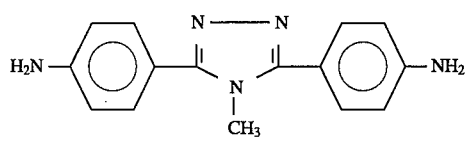
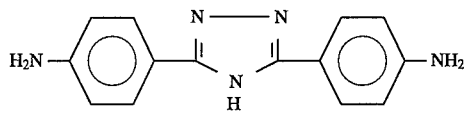
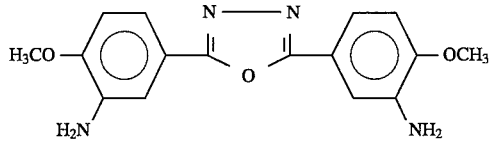
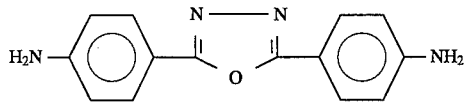
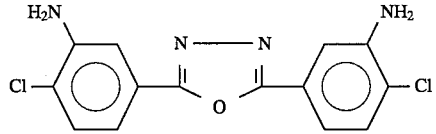
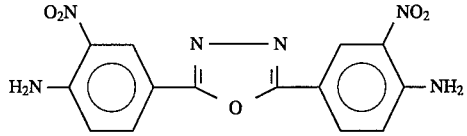

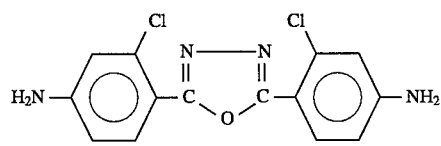
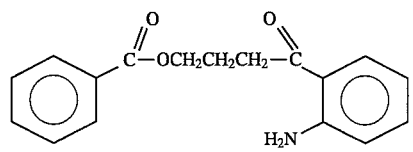
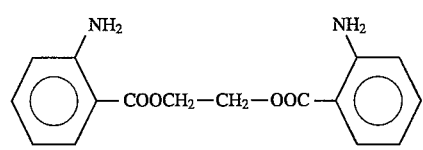
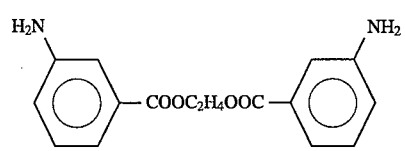
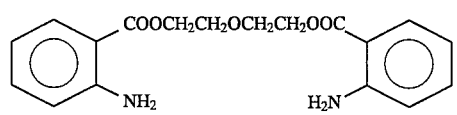
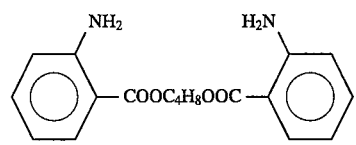
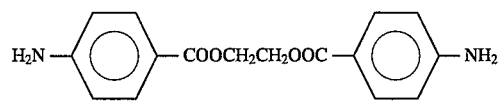
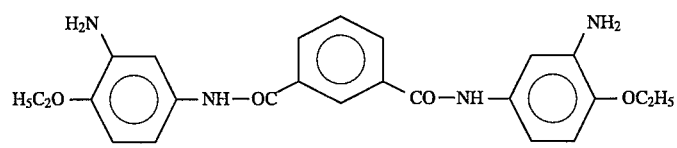
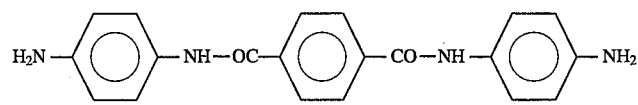
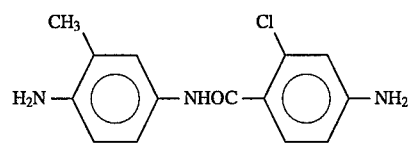
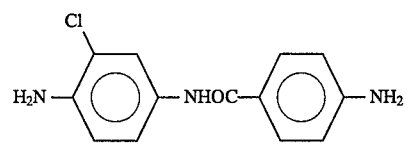
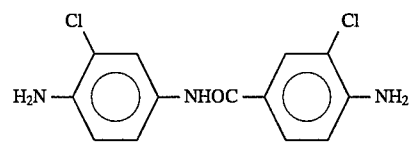

-continued
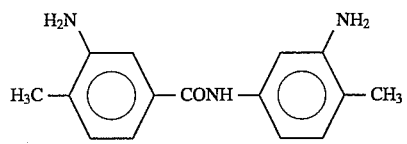
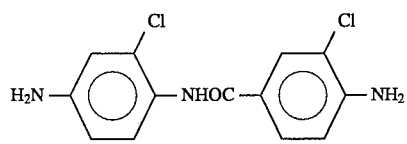
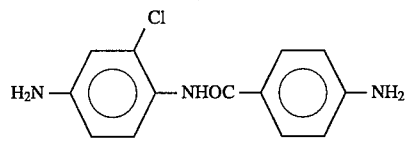
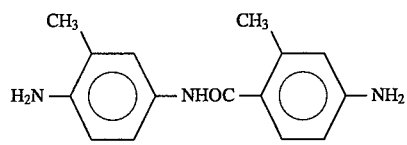
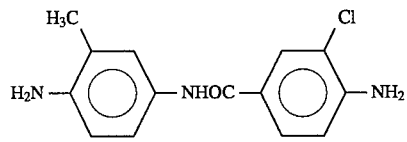
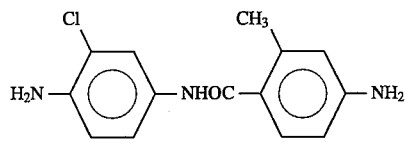
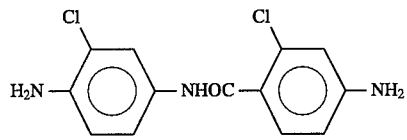
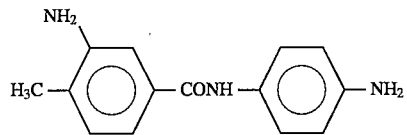
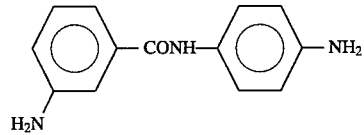
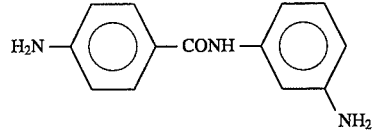
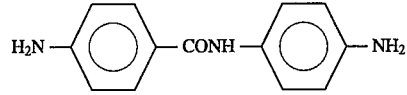

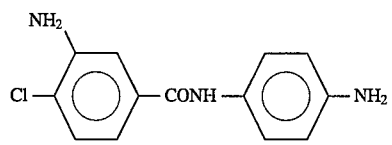
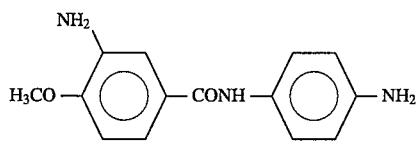
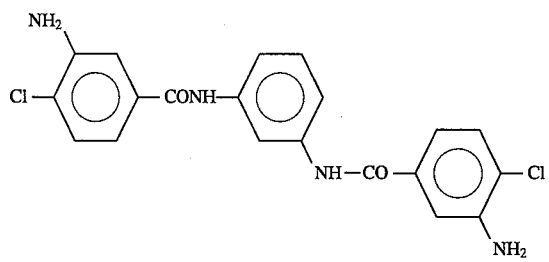
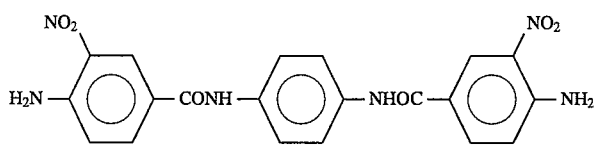
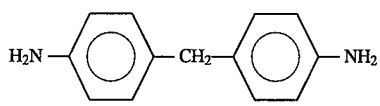
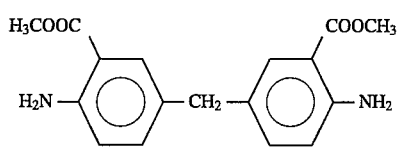
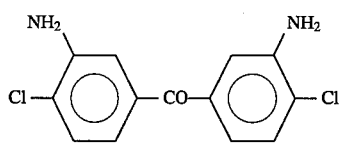
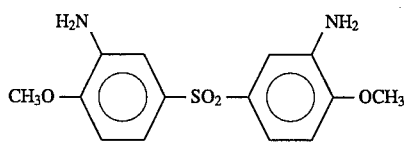
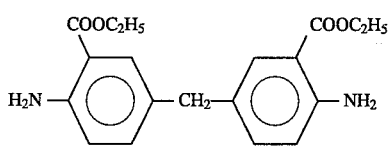
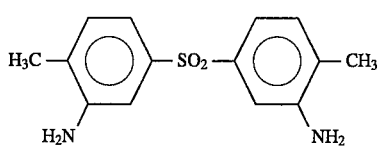
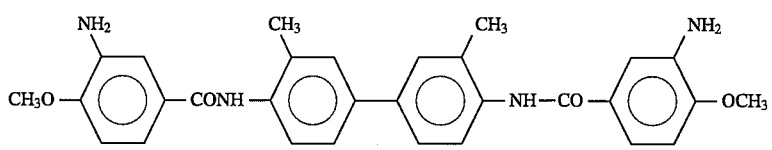

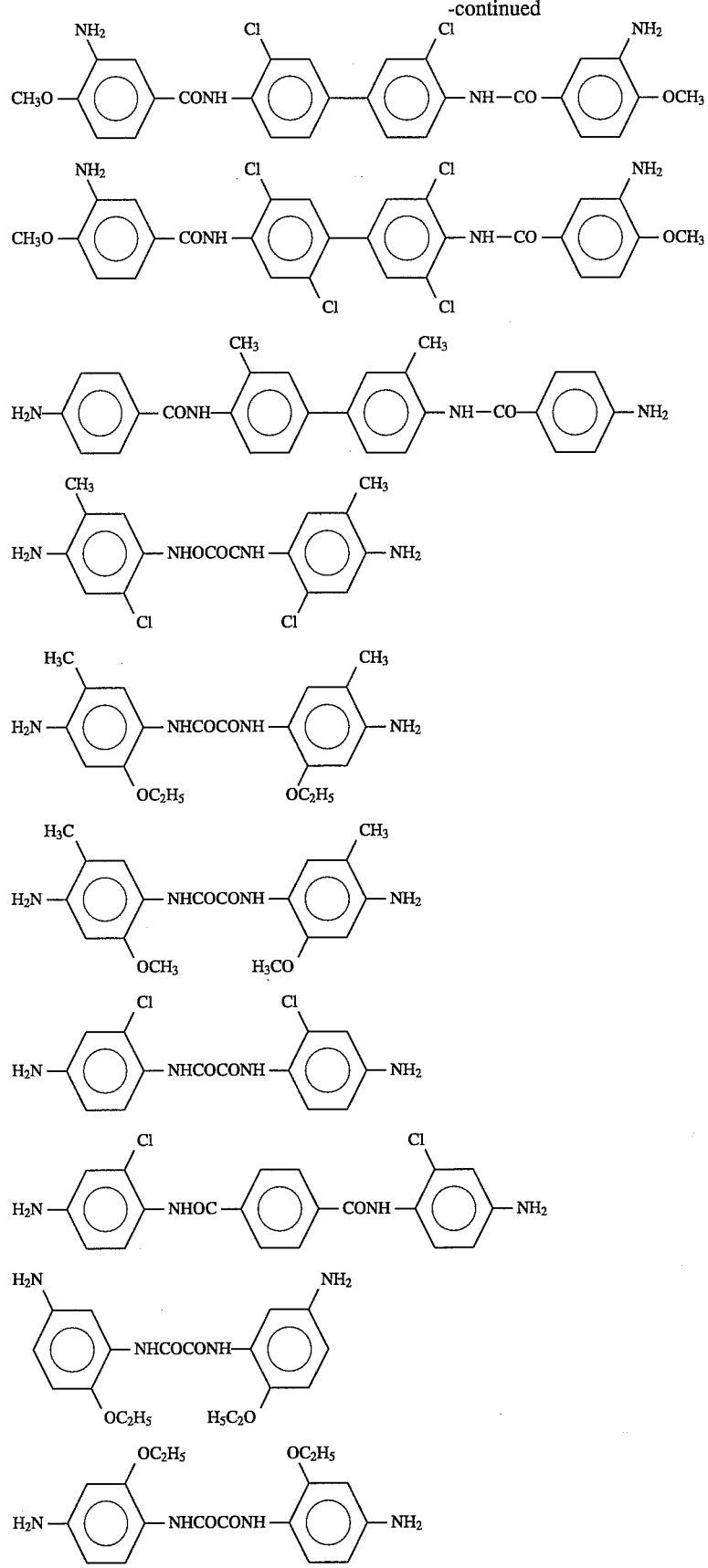

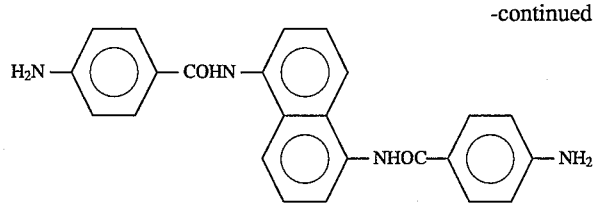
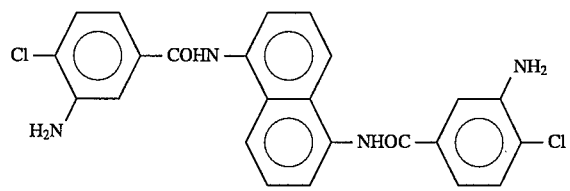
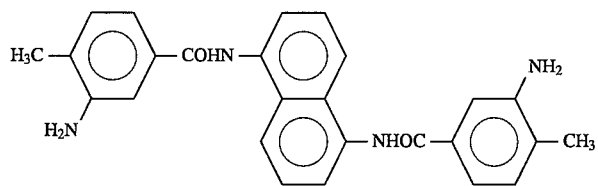
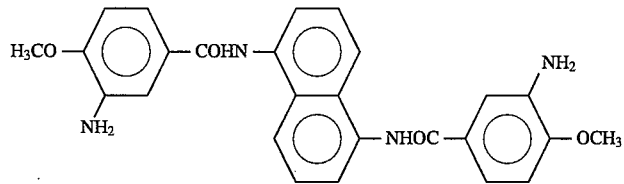
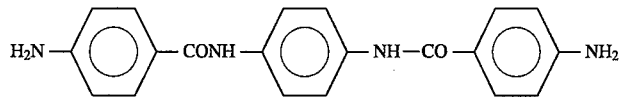
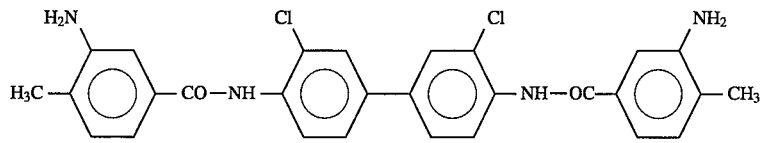
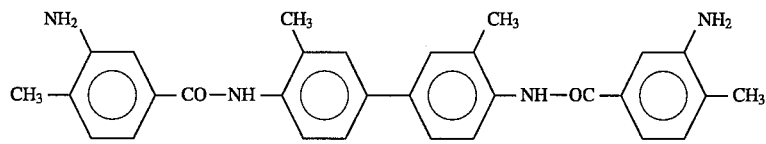
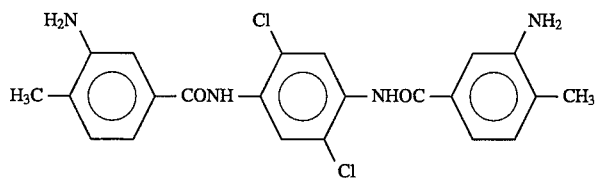
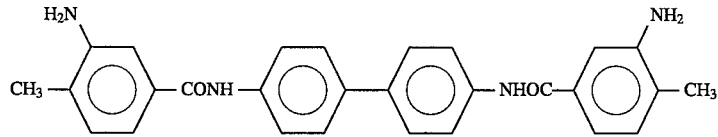
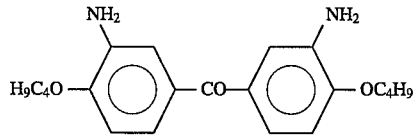

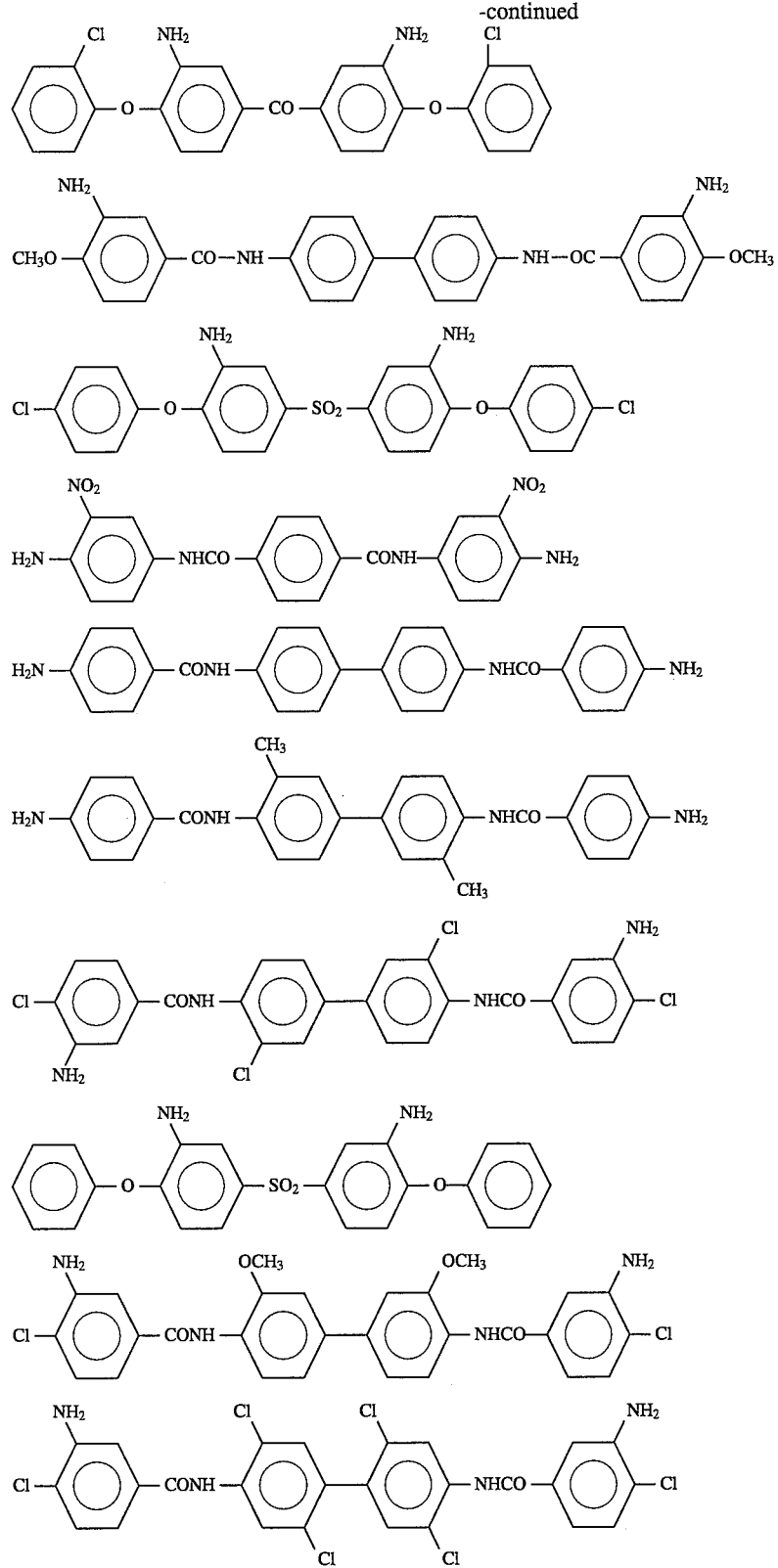

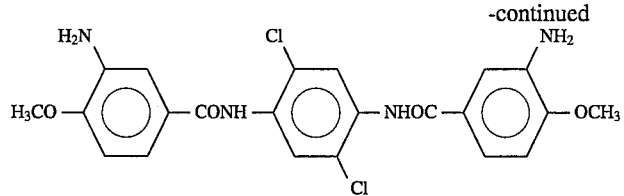
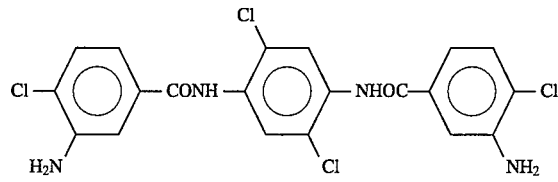
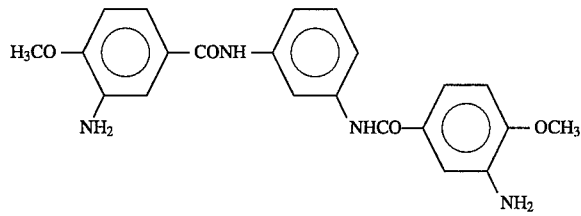
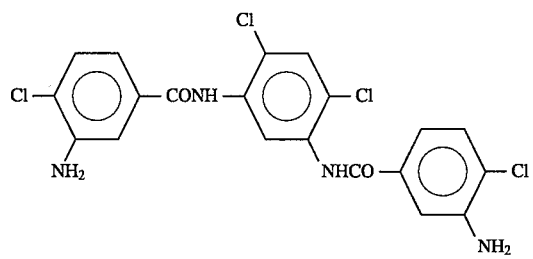
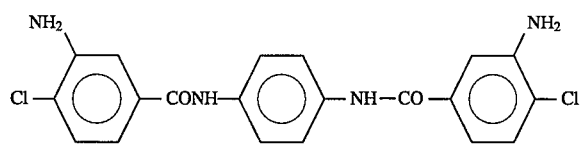
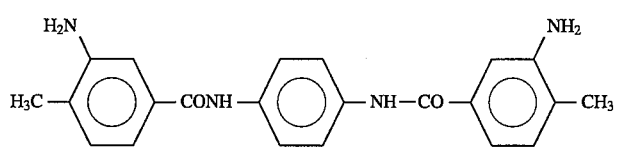
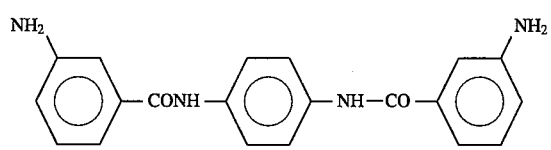
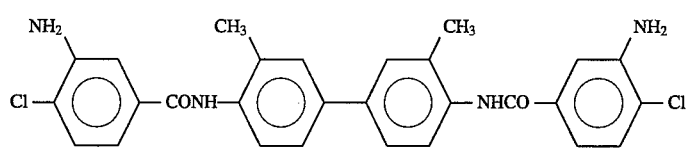
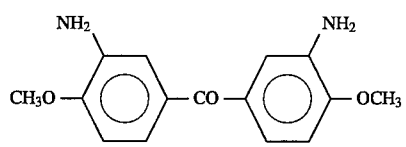

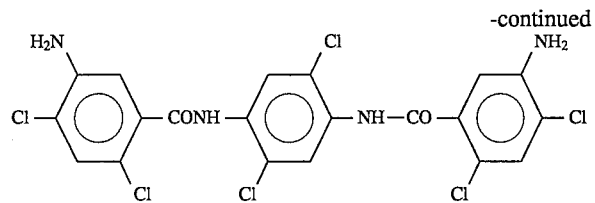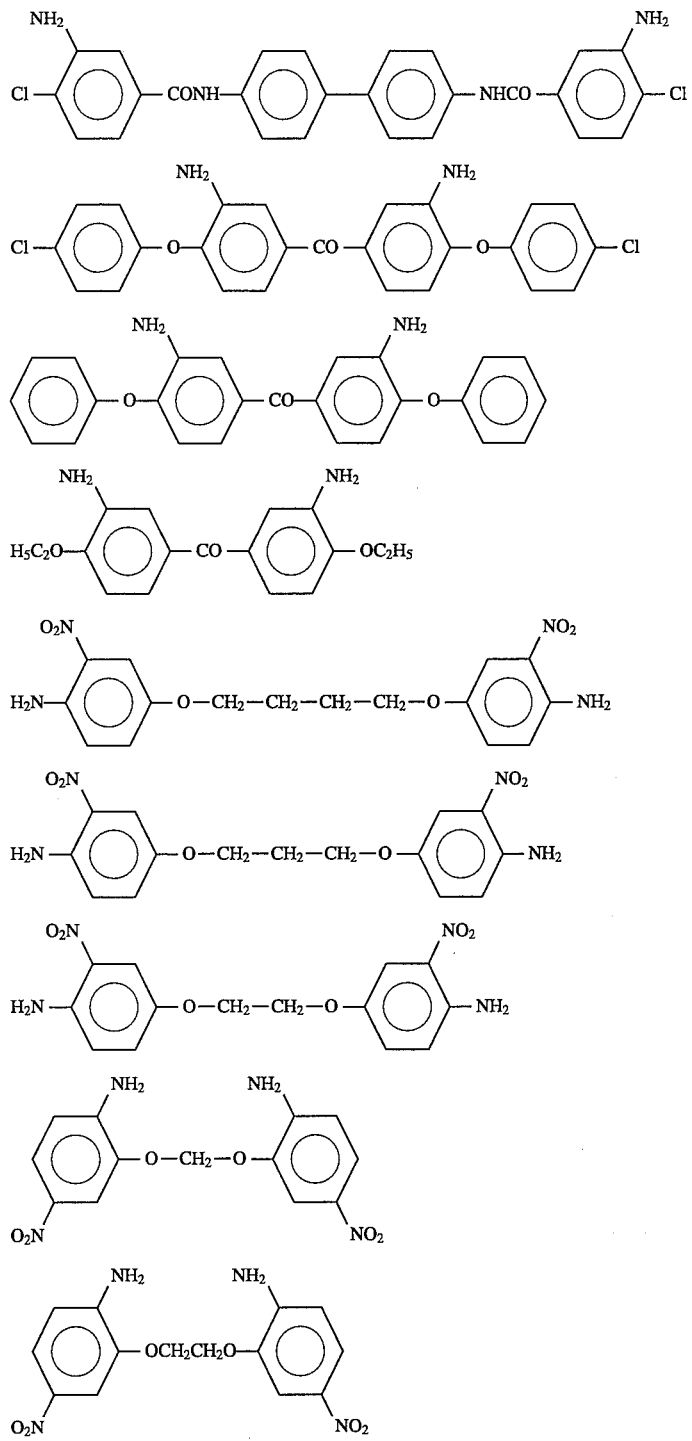

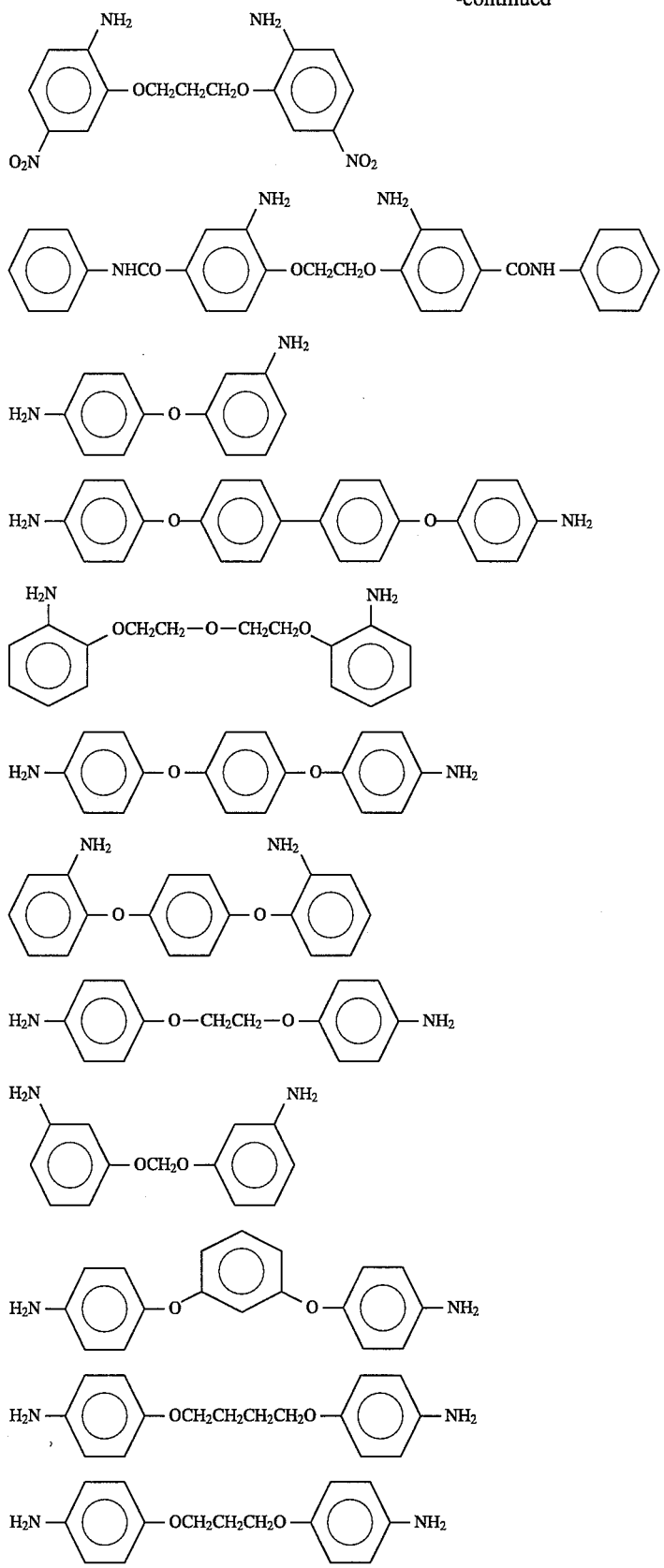

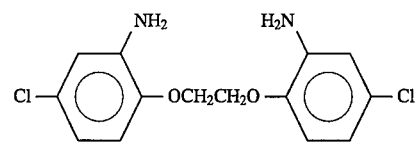
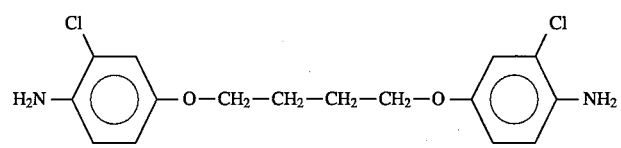
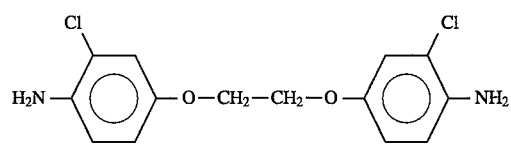
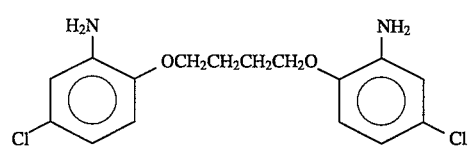
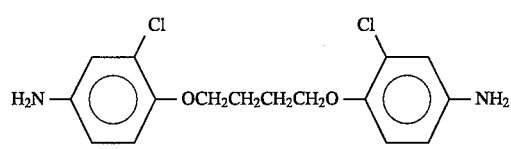
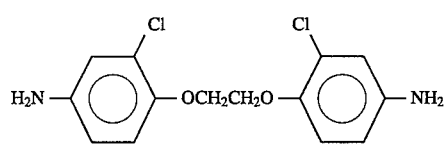
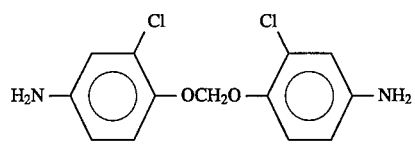
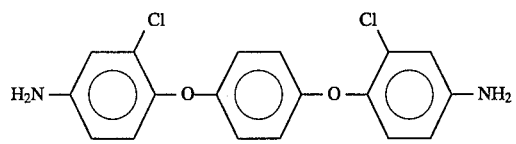
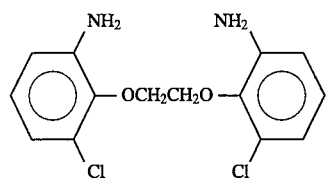
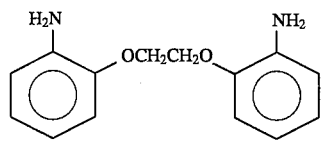
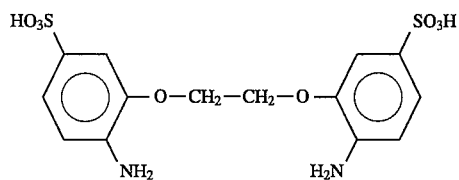

-continued
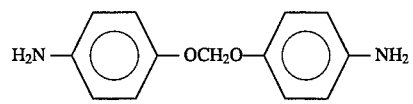
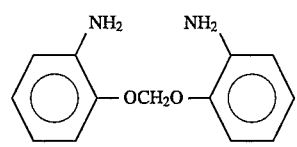
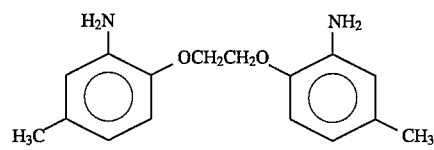
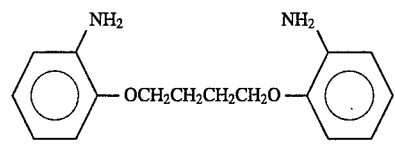
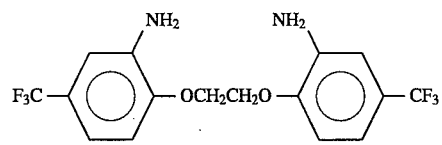
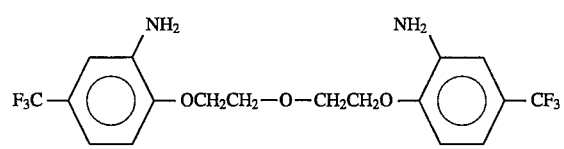
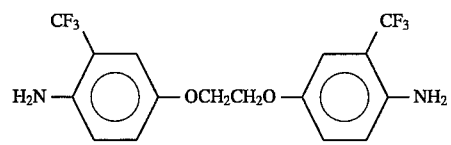
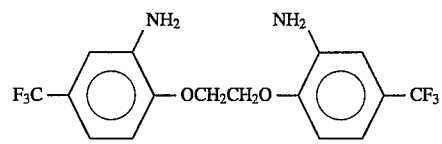
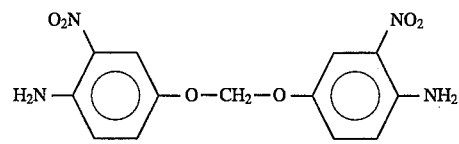
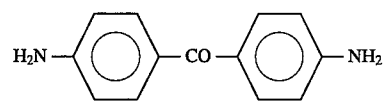
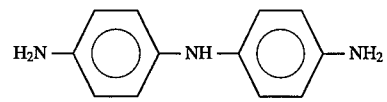
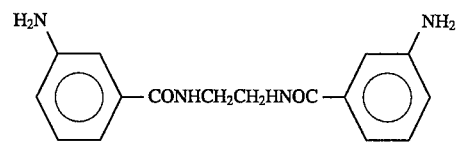

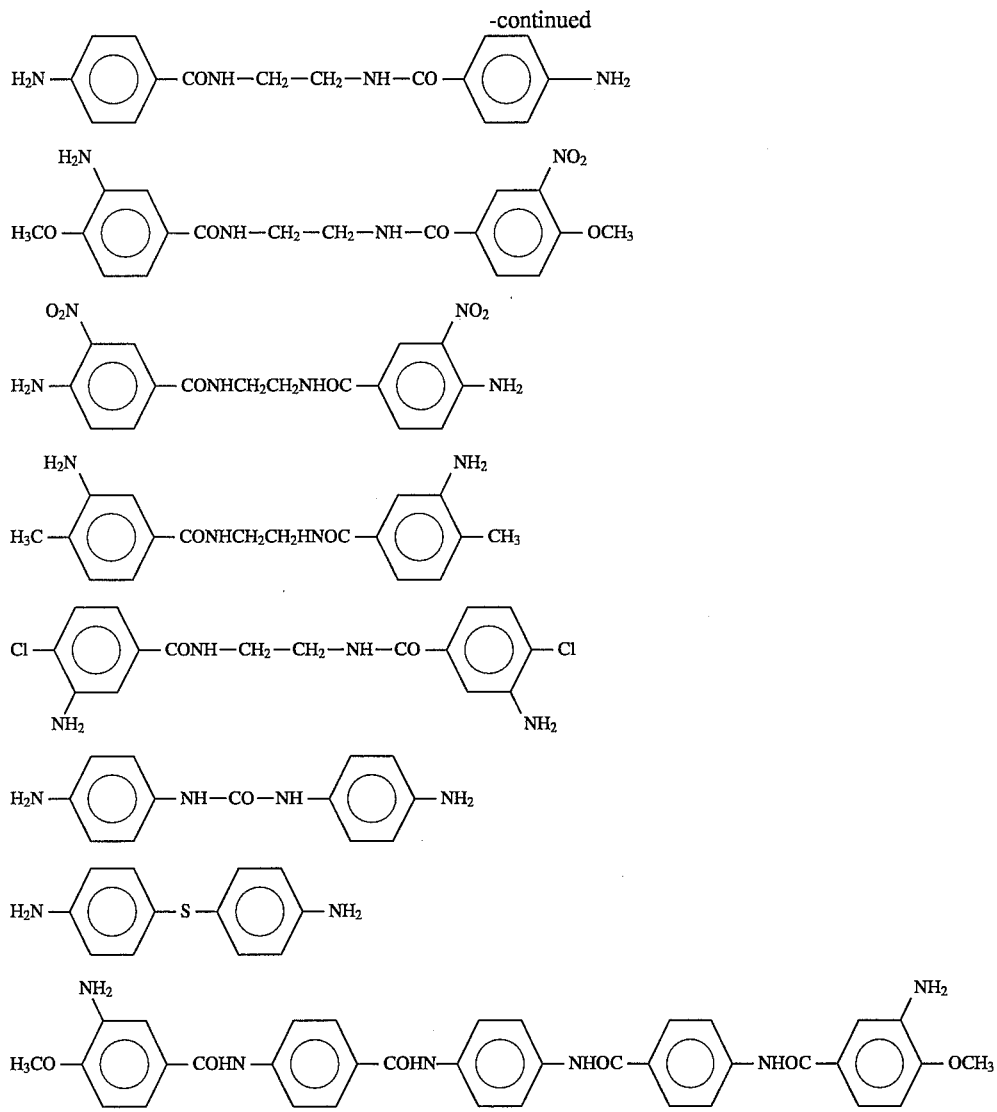

The (benzoxazol-2-yl)- and (benzimidazol-2-yl)-N-aryl- or -heteroarylacetamides of the formula (II) to be used as coupling components for the azo coupling of the present invention can be prepared, for example, by procedures analogous to those for the synthesis of a number of representatives of similar structure of this class of compound described in J. Amer. Chem. Soc. 65, 1072 (1943) and in Belgian Patent 815,673 from the esters of the abovementioned heterocycle-substituted acetic acids of the formula (III) by reaction with aromatic amines of the R—$NH_2$ type in accordance with the following reaction scheme

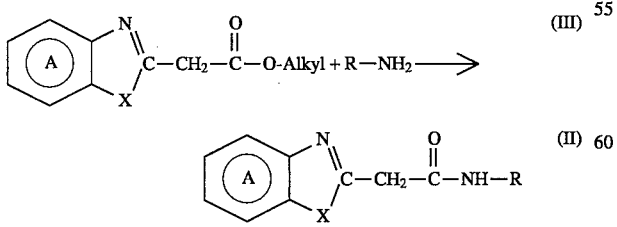

in which the symbols R and X have the same meaning as $R^1$, $R^2$ and $X^1$, $X^2$ in formula (I), ring A can be fused or substituted in the same manner as in formula (I) and alkyl in formula (III) is an alkyl radical, in particular the ethyl radical.

The esters (III) required for the synthesis of the coupling components (II) are obtainable by methods known from the references listed below or by procedures derived therefrom:

J. Amer. Chem. Soc. 65, 1072–1075 (1943)

Belgian Patent 815,673

German Offenlegungsschrift 2,632,402

Chem. Ber. 84, 719–729 (1951)

J. Amer. Chem. Soc. 65, 1854–1858 (1943)

Chem. Ber. 113, 2311–2313 (1980)

JP-A2-48/34747 (1973)

Liebigs Ann. Chem. 1973, 573–577

French Patent 1,580,823

Chem. Ber. 100, 1661–1666 (1967).

The selection of the aromatic amines R–$NH_2$ suitable for this synthesis depends on the desired nature of the aryl or heteroaryl radical R and is in accordance with the meaning of $R^1$ and $R^2$ in formula (I). Thus, as a consequence of the particular structural relationships, all of those monoamines which in the preceding description have been considered suitable for use as diazo components are in principle available for this purpose.

The monoazo or disazo compounds of the formula (I) are produced by processes known per se by coupling the diazotized amines or diamines with the abovementioned coupling components, usually in an aqueous medium, in which the presence of nonionic, anionic or cationic surface-active substances may be advantageous. If desired, it is also possible to use other auxiliaries, such as natural or synthetic resins, or resin derivatives or to add surface coating, printing ink or plastic additives in the preparation process of the azo compounds. Likewise, it may be favorable in certain cases to carry out the coupling reaction entirely or in part in the presence of suitable organic solvents.

However, if a combination of a plurality of different coupling components is used for the coupling process of the diazo component described above, the result of such a mixed coupling is the formation of a plurality of different monoazo compounds, which is also the case if only one coupling component is reacted with a plurality of diazotized amines. In terms of practical application, pigment mixtures of particular interest are obtained by reacting a bisdiazonium salt with a mixture of a plurality of, preferably two, different coupling components. This results in mixtures comprising symmetrical and unsymmetrical disazo compounds (n=1), and in the case of two coupling components two symmetrical and one unsymmetrical compounds are obtained.

The compounds according to the invention of the formula (I) are valuable water-insoluble colorants and can be isolated after the coupling reaction in the usual manner. It is often advantageous to subject the azo colorants obtained after the coupling reaction, in particular in the case of crude pigments, to a thermal aftertreatment for achieving the full color strength and a particularly favorable texture and advantageous crystal structure, for example at temperatures of between 60° and 200° C., preferably 120° to 160° C. For example, for this purpose, the moist press cakes or the dried and milled pulverulent compounds can be heated at elevated temperatures under reflux or superatmospheric pressure in inert organic, in particular polar, solvents, such as, for example, pyridine, N-methyl-2-pyrrolidone, dimethylformamide, dimethyl sulfoxide, sulfolane (tetramethylene sulfone), alcohols, chlorobenzene, dichlorobenzene, glacial acetic acid, quinoline, glycol, nitrobenzene or high-boiling aromatic hydrocarbons or mixtures thereof for a certain period of time. On certain occasions, it is possible to convert the compounds into a particularly advantageous crystal structure by simply heating them with water, if necessary under increased pressure and with or without the addition of dispersants or organic solvents, for example of the abovementioned type.

Furthermore, those compounds according to the invention of the formula (I) which contain one or more lakable acid groups, such as sulfo or carboxyl groups, can be converted into color lakes by known processes. For forming the color lakes, the usual metal ions, preferably manganese ions or strontium ions, but in particular calcium ions and barium ions, are used. The invention also relates to the use of the water-insoluble monoazo and disazo compounds of the formula (I) or mixtures thereof for the coloring or pigmenting of high-molecular-weight organic materials of natural or synthetic origin. Depending upon whether the compounds prepared according to the invention have no or only short alkyl chains up to about $C_4$ or, alternatively, medium-length or long alkyl chains, they are, for example, usable as pigments, disperse dyes or oil-soluble dyes. The compounds of the formula (I) having short alkyl chains or no alkyl chains are preferably used as polymer-insoluble colorants for the coloring of moldable plastics. For example, they are suitable for pigmenting polystyrene, polyolefins, in particular polyethylene or polypropylene, polyacrylic compounds, polyvinyl compounds, in particular polyvinyl chloride or polyvinyl acetate, polyesters, rubber, casein resins and silicone resins. Furthermore, they can be used for the preparation of printing inks, for the preparation of gloss and emulsion paints, for the printing of substrates, such as textile fibers or also other sheet-like structures, such as, for example, paper.

The pigments or mixtures according to the invention, preferably in finely divided form, have also proven suitable for the mass-coloring of filament made of viscose or cellulose ethers, cellulose esters, polyamides, polyurethanes or polyglycol terephthalates or for the pulp-dyeing of paper.

In the examples which follow, parts are by weight and parts by volume relate to parts by weight as the liter relates to the kilogram.

EXAMPLE 1 a) 123.2 parts of 2-amino-4-methylphenol and 195.6 parts of carbethoxyacetimino ethyl ester hydrochloride [prepared according to J. Amer. Chem. Soc. 67, 1019 (1945)] are stirred in 1500 parts by volume of chloroform at room temperature for 24 hours with the exclusion of moisture. The resulting reaction mixture is then filtered, and the residue is washed with chloroform. The combined filtrates are first extracted with dilute hydrochloric acid and then with water, the organic phase is separated off, dried over calcium chloride and evaporated to dryness. The solid residue is then stirred with a mixture of ethanol and water (1:1), the product filtered off with suction, then washed with a 1:1 mixture of ethanol and water and dried, giving 82.5 parts of ethyl (5-methylbenzoxazol-2-yl)acetate of melting point 68°–69° C.

b) 84.3 parts of ethyl (5-chlorobenzoxazol-2-yl)acetate of melting point 90°–91° C. are obtained in the manner described in Example 1a from 143.6 parts of 2-amino-4-chlorophenol and 195.6 parts of carbethoxyacetimino ethyl ester hydrochloride.

c) 156.5 parts of 1,2-diamino-4-chloro-5-methylbenzene and 195.6 parts of carbethoxyacetimino ethyl ester hydrochloride are stirred in 2000 parts by volume of chloroform at room temperature for 24 hours with the exclusion of moisture. After prior filtration of the reaction mixture and washing of the residue with chloroform, the combined filtrates are evaporated to dryness. The solid residue is recrystallized from ethyl acetate (activated carbon), giving 110.0 parts of ethyl [5(6)-chloro-6(5)-methylbenzimidazol-2-yl]acetate of melting point 150°–152° C.

d) 50.0 parts of carbethoxyacetimino ethyl ester hydrochloride and 31.2 parts of 1,2-diamino-4-methylbenzene are reacted and worked up by the method described in Example 1c. 18.5 parts of ethyl [5(6)-methylbenzimidazol-2-yl]acetate of melting point 153.5°–154.5° C. are obtained.

e) 50.0 parts of carbethoxyacetimino ethyl ester hydrochloride and 31.2 parts of 1,2-diamino-4-methylbenzene are dissolved in 400 parts by volume of anhydrous ethanol, and the solution is stirred at room temperature for 2 hours with the exclusion of moisture. The reaction mixture is then evaporated to dryness, the residue is stirred with 500 parts by volume of boiling ethyl acetate, and the solid is filtered off. The filtrate is clarified with activated carbon and concentrated to 200 parts by volume or residual liquid. The precipitate separated out after cooling is filtered off and dried, giving 28.7 parts of ethyl [5(6)-methylbenzimidazol-2-yl]acetate of melting point 153°–154.5° C.

EXAMPLE 2 a) 102 parts of ethyl (benzimidazol-2-yl)acetate [prepared according to J. Amer. Chem. Soc. 65, 1075 (1943)] and 61.5 parts of 2-aminoanisole are mixed with one another and heated at 190° C. for 3 hours, during which the ethanol formed in the course of the reaction is distilled off. The reaction mixture is then allowed to cool to 110° C., charged with 500 parts by volume of toluene and stirred for another 10 minutes, and the precipitated product is filtered off with suction while hot. The filter residue is washed with toluene and dried. The crude product thus obtained is dissolved in 2000 parts by volume of boiling methanol, activated carbon is added, and the mixture is filtered. The filtrate is poured into 3000 parts by volume of ice-water with stirring, and the precipitate formed is filtered off with suction. The resulting press cake is washed with a 3:1 mixture of water and methanol and dried, giving 84.3 parts of a compound of the formula

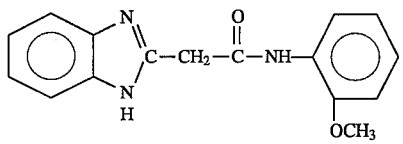

of melting point 182°–184° C.

b) 204 parts of ethyl (benzimidazol-2-yl)acetate and 149 parts of 5-aminobenzimidazol-2-one are heated at 190° C. in 1000 parts by volume of 1,2,4-trichlorobenzene for 3 hours. The ethanol eliminated during the reaction is continuously distilled off. After cooling to 100° C., 300 parts by volume of toluene are added to the reaction mixture, and the solid components are filtered off with suction. The filter residue is washed with toluene and dried, giving 287 parts of a compound of the formula

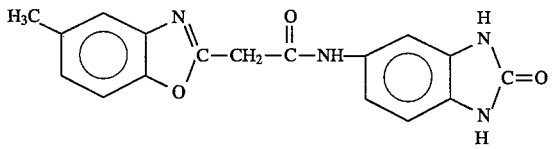

having a melting point of more than 350° C.

c) 44.7 parts of 5-aminobenzimidazol-2-one and 65.8 parts of ethyl (5-methylbenzoxazol-2-yl)acetate [prepared according to Example 1a] are heated to 200° C. (bath) in 200 parts by volume of N-methyl-2-pyrrolidone and maintained at this temperature for 2 hours, during which the ethanol released is distilled off. The reaction mixture is then allowed to cool to room temperature, 1000 parts by volume of ethanol are added, and the product is filtered off. The solid residue is washed with ethanol and dried, giving 83.3 parts of a compound of the formula

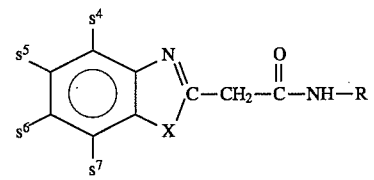

having a melting point of more than 350° C.

EXAMPLES 2d to 2o

Analogously to Examples 2a to 2c, the coupling components of the formula (IIa) listed in Table I below are obtained by reaction of compounds of the formula (III) in which alkyl is ethyl with amines of the formula R—$NH_2$ in which R is varied in each case as described below.

![formula (IIa): benzazole with $S^4$, $S^5$, $S^6$, $S^7$ substituents, X in ring, connected to C-$CH_2$-C(=O)-NH-R]

TABLE I

| Ex. | X | $S^4$ | $S^5$ | $S^6$ | $S^7$ | R | M.P. [°C.] * = with decomposition |
|-----|-----|-----|-----|-----|-----|-----|-----|
| 2d | NH | H | H | H | H | 5-methylbenzimidazol-2-one-yl | 265* |
| 2e | NH | H | H | H | H | phenyl | 238* |
| 2f | NH | H | H | H | H | 2-chlorophenyl | 217* |

TABLE I-continued
| Ex. | X | S⁴ | S⁵ | S⁶ | S⁷ | R | M.P. [°C.] * = with decomposition |
|---|---|---|---|---|---|---|---|
| 2g | NH | H | H | H | H | 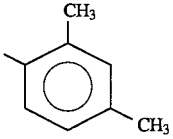 | 254–256 |
| 2h | NH | H | H | H | H | 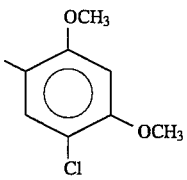 | 248–249 |
| 2i | NH | H | H | H | H | 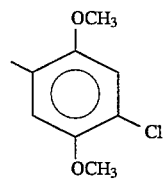 | 256–258 |
| 2j | NH | H | CH₃(Cl) | Cl(CH₃) | H | 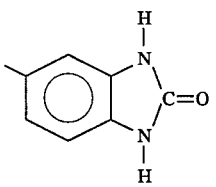 | >350 |
| 2k | NH | H | CH₃(H) | H(CH₃) | H | 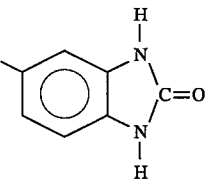 | >350 |
| 2l | O | H | H | H | H | 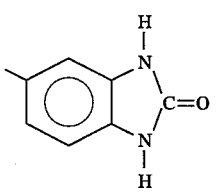 | >350 |
| 2m | O | H | Cl | H | H | 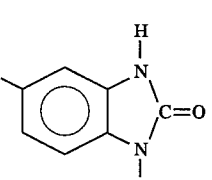 | >350 |
| 2n | O | H | OCH₃ | H | H | 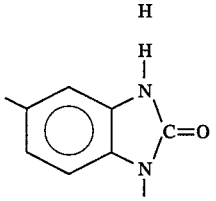 | >350 |

TABLE I-continued

| Ex. | X | $S^4$ | $S^5$ | $S^6$ | $S^7$ | R | M.P. [°C.]<br>* = with<br>decomposition |
|---|---|---|---|---|---|---|---|
| 2o | O | H | Cl | H | H | 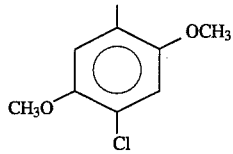 | 205 |

EXAMPLE 3

8.63 parts of 4-chloro-2-nitroaniline are stirred overnight in 100 parts by volume of water and 15 parts by volume of 31% hydrochloric acid. The initially introduced amine is diazotized at 0°–5° C. (external cooling) by addition of 10 parts by volume of 5N sodium nitrite solution. The batch is then stirred for another hour, the diazonium salt solution prepared is clarified by filtration, and the nitrite excess is destroyed with sulfamic acid.

14.1 parts of the coupling component produced by the procedure of Example 2a are dissolved in 300 parts by volume of water and 30 parts by volume of glacial acetic acid, and 10 parts by volume of a 12.5% aqueous formulation of an anionic auxiliary based on an esterified alkylphenol novolak alkoxylate according to Example 3.5.4 of European Patent 0,065,751 and 17.0 parts of sodium acetate are added. The solution of the abovementioned diazonium salt is slowly added dropwise or run into the mixture thus prepared at 15°–20° C. After coupling is complete, the pH of the reaction mixture is brought to 4 by means of dilute sodium hydroxide solution, the reaction mixture is heated to 85° C. by introducing steam, this temperature is maintained for 30 minutes, the precipitated pigment is filtered off with suction and washed with water.

The moist press cake is then stirred with 500 parts by volume of acetone at room temperature for 10 minutes. The product is filtered off with suction and dried, giving 18.2 parts of a reddish yellow monoazo pigment of the formula

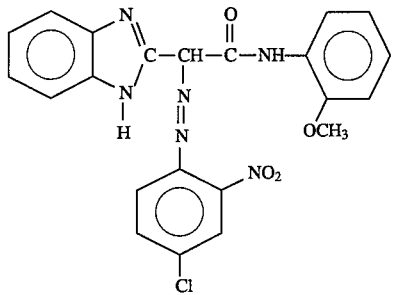

of melting point 256°–258° C.

EXAMPLE 4

10.46 parts of dimethyl aminoterephthalate are stirred in 300 parts by volume of water and 15 parts by volume of 31% hydrochloric acid for 2 hours. The initially introduced amine is diazotized at 0°–5° C. (external cooling) with 10 parts by volume of 5N sodium nitrite solution, and the mixture is stirred for another hour. The diazonium salt solution thus obtained is clarified by filtration, and the nitrite excess is destroyed by means of sulfamic acid.

300 parts by volume of water, 20 parts by volume of 4N sodium acetate solution and 5 parts by volume of a 12.5% formulation of the anionic auxiliary from European Patent 0,065,751 described in Example 3 are initially introduced into a coupling vessel. A hot solution at 80° C. comprising 15.40 parts of the coupling component prepared by the procedure of Example 2b in 200 parts by volume of glacial acetic acid and 100 ml of water is added. The solution of the previously produced diazo component is slowly run into or added dropwise to this mixture at 10°–15° C. After coupling is complete, the reaction mixture is heated to 95° C. by introducing steam and maintained at this temperature for 30 minutes. The crude pigment formed is filtered off with suction and washed with water.

The moist press cake is refluxed in 800 parts by volume of glacial acetic acid for 15 minutes, cooled and filtered off with suction, washed with glacial acetic acid and water, dried and milled. In this manner, 19.6 parts of the monoazo pigment of the formula

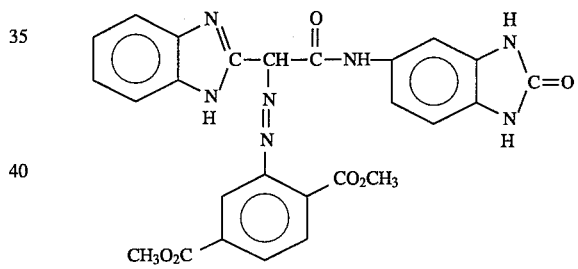

and having a decomposition point of 336° C. are obtained. The resulting pigment of high color strength upon incorporation in polyvinyl chloride or polyethylene gives a greenish yellow coloration of good lightfastness, excellent fastness to bleeding and excellent heat resistance.

EXAMPLE 5

7.61 parts of 2-methyl-4-nitroaniline are stirred in 30 parts by volume of glacial acetic acid and 20 parts by volume of 31% hydrochloric acid, and the mixture is diazotized at 5°–10° C. (external cooling) with 10 parts by volume of 5N sodium nitrite solution and stirred for another 30 minutes. The diazonium salt solution is clarified by filtration, and the nitrite excess is destroyed with sulfamic acid.

500 parts by volume of water, 15 parts of sodium acetate and 1 part of a nonionic auxiliary of the fatty alcohol polyglycol ether type obtained from 1 mol of isotridecyl alcohol and 6 mol of ethylene oxide are initially introduced into a coupling vessel. A hot solution at 80° C. comprising 15.40 parts of the coupling component prepared according to Example 2b in 200 parts by volume of glacial acetic acid and 100 parts by volume of water are added to this batch. The solution of the abovementioned diazo component is slowly run into or added dropwise to the initially introduced mixture at 50°–60° C. After coupling is complete, the reaction mixture is heated to 90° C. by introducing steam, the coupling product formed is then filtered off with suction, washed with water, dried and milled.

The dry pigment isolated in this manner is then refluxed in 180 parts by volume of a 1:1 mixture of N-methyl-2-pyrrolidone and glacial acetic acid for 1 hour, filtered off with suction, washed first with glacial acetic acid and then with ethanol, dried and milled.

20.57 parts of a pigment of the formula

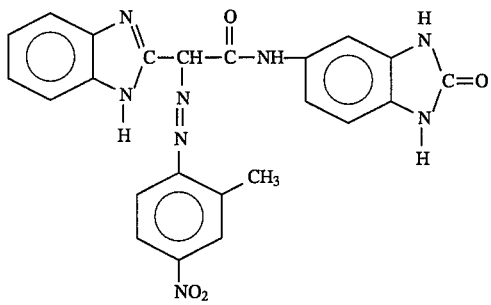

having a melting point of more than 350° C. are obtained. This monoazo pigment of very high color strength, upon incorporation in polyvinyl chloride or in an alkyd/melamine resin varnish, gives very pure, reddish yellow colorations having good fastness to bleeding and excellent fastness to overcoating.

EXAMPLE 6

10.46 parts of dimethyl aminoterephthalate are diazotized in 150 parts by volume of glacial acetic acid and 20 parts by volume of 31% hydrochloric acid at 5°–10° C. (external cooling) with 10 parts by volume of 5N sodium nitrite solution. After stirring for another 30 minutes the diazonium salt solution is clarified by filtration, and the nitrite excess is destroyed by means of sulfamic acid. A suspension of 16.50 parts of the coupling component produced by the procedure of Example 2c in 150 parts by volume of pyridine and 30 parts by volume of 4N sodium acetate solution is added in portions to the initially introduced solution of the above diazo component at room temperature. After coupling is complete, another 250 parts by volume of water are added to the reaction mixture, the mixture is heated to 70° C. and this temperature is maintained for 30 minutes. The coupling product is then filtered off with suction and washed with 90% acetic acid.

The moist press cake is stirred in 250 parts by volume of glacial acetic acid and refluxed for 10 minutes. The pigment thus treated is filtered off with suction, washed with glacial acetic acid and acetone, dried and milled.

22.62 parts of a pigment of the formula

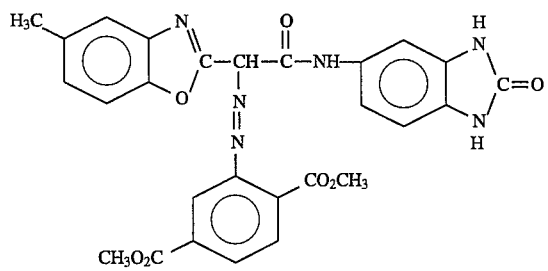

of melting point 348°–350° C. are obtained. Upon incorporation in an alkyd/melamine resin varnish, it produces reddish yellow colorations having excellent fastness to overcoating.

EXAMPLES 7 to 58

Analogously to Examples 3 to 6 further monoazo pigments of the formula (I) where n is 0, which are characterized in Table II below by hue and melting point, are obtained according to the invention by using the diazo components of the formula D-NH$_2$ and coupling components of the formula (II) described below in more detail in each case in a suitable molar ratio.

TABLE II

| Ex. | Diazo component D-NH$_2$ | Coupling component from Example | m.p.[°C.] * = with decomposition | Hue |
| --- | --- | --- | --- | --- |
| 7 | 3-Amino-4-carboxymethyl-2',5'-dichlorobenzanilide | 2a | 251 | greenish yellow |
| 8 | 5-Aminobenzimidazol-2-one | 2a | 325* | reddish yellow |
| 9 | 3-Amino-4-methoxybenzanilide | 2a | 283* | greenish yellow |
| 10 | Dimethyl aminoterephthalate | 2a | 183 | greenish yellow |
| 11 | 3-Amino-4-chlorobenzamide | 2a | 315* | greenish yellow |
| 12 | 5-Amino-6-methylbenzimidazol-2-one | 2a | 340* | orange |
| 13 | Dimethyl 5-aminoisophthalate | 2a | 229 | reddish yellow |
| 14 | 4-Methoxy-2-nitroaniline | 2a | 239 | yellowish red |
| 15 | 4-Methyl-2-nitroaniline | 2a | 235 | reddish yellow |
| 16 | Methyl 2-aminobenzoate | 2a | 215 | reddish yellow |
| 17 | 2-Methyl-4-nitroaniline | 2a | 290 | reddish yellow |
| 18 | 3-Amino-4-chlorobenzamide | 2b | >350 | greenish yellow |
| 19 | 3-Amino-4-methoxybenzanilide | 2b | 345* | yellow |
| 20 | 2-Amino-4-carboxy-2',5'-dichlorobenzanilide | 2b | 333* | yellow |
| 21 | 4-(3-Amino-4-carboxymethylbenzoylamino)-benzamide | 2b | >350 | greenish yellow |
| 22 | Dimethyl 5-aminoisophthalate | 2b | 343* | greenish yellow |
| 23 | 4-Chloro-2-nitroaniline | 2b | >350 | orange |
| 24 | 2-Methyl-5-nitroaniline | 2b | >350 | greenish yellow |
| 25 | 2-Methoxy-4-nitroaniline | 2b | >350 | orange |
| 26 | 4-Methoxy-2-nitroaniline | 2b | >350 | orange |

TABLE II-continued

| Ex. | Diazo component D-NH₂ | Coupling component from Example | m.p.[°C.] * = with decomposition | Hue |
|---|---|---|---|---|
| 27 | 4-Methyl-2-nitroaniline | 2b | 335* | reddish yellow |
| 28 | Methyl 2-aminobenzoate | 2b | 341* | yellow |
| 29 | 2-Aminobenzotrifluoride | 2b | 350* | greenish yellow |
| 30 | 3-Amino-4-methoxybenzanilide | 2d | 338* | greenish yellow |
| 31 | 3-Amino-4-carboxymethyl-2',5'-dichlorobenzanilide | 2g | 268–270 | greenish yellow |
| 32 | 3-Amino-4-chlorobenzamide | 2g | 327–329 | greenish yellow |
| 33 | 2-Methoxy-5-nitroaniline | 2g | 288 | yellow |
| 34 | 3-Amino-4-carboxymethyl-2',5'-dichlorobenzanilide | 2h | 309 | greenish yellow |
| 35 | 3-Amino-4-chlorobenzamide | 2h | 310 | greenish yellow |
| 36 | 2-Methoxy-5-nitroaniline | 2h | 313* | yellow |
| 37 | 3-Amino-4-carboxymethyl-2',5'-dichlorobenzanilide | 2i | 299-301 | yellow |
| 38 | 3-Amino-4-chlorobenzamide | 2i | 325 | greenish yellow |
| 39 | Dimethyl aminoterephthalate | 2i | 219 | yellow |
| 40 | 2-Methoxy-5-nitroaniline | 2i | 306 | yellow |
| 41 | Dimethyl aminoterephthalate | 2j | >350 | reddish yellow |
| 42 | Dimethyl aminoterephthalate | 2k | 328* | reddish yellow |
| 43 | Dimethyl aminoterephthalate | 2l | 315* | reddish yellow |
| 44 | 4-(3-Amino-4-methoxybenzoylamino)benzamide | 2l | 330 | greenish yellow |
| 45 | 3-Amino-4-methoxybenzanilide | 2l | 322* | greenish yellow |
| 46 | 4-Chloro-2-nitroaniline | 2l | 326* | yellow |
| 47 | 3-Amino-4-carboxymethyl-2',5'-dichlorobenzanilide | 2m | >350 | greenish yellow |
| 48 | Dimethyl aminoterephthalate | 2m | >350 | reddish yellow |
| 49 | 3-Amino-4-methoxybenzanilide | 2m | 330* | reddish yellow |
| 50 | 2-Methoxy-4-nitroaniline | 2m | >350 | orange |
| 51 | Methyl 2-aminobenzoate | 2m | 323 | yellow |
| 52 | 2-Chloro-4-nitroaniline | 2m | >350 | orange |
| 53 | 2,5-Dichloroaniline | 2m | 348* | reddish yellow |
| 54 | 4-Chloro-2-nitroaniline | 2m | 340-342 | orange |
| 55 | 3-Amino-4-methoxybenzanilide | 2c | 317-319 | reddish yellow |
| 56 | 4-Chloro-2-nitroaniline | 2c | 328* | orange |
| 57 | 4-Amino-2,5-dimethoxybenzene sulfanilide | 2o | 310 | yellow |
| 58 | Dimethyl aminoterephthalate | 2n | 325* | greenish yellow |
| 59 | 1-Aminoanthraquinone | 2b | >340 | orange |
| 60 | 2-Methoxy-5-nitroaniline | 2m | >340 | reddish yellow |

EXAMPLE 61

11.1 parts of 2-amino-5-chloro-4-methylbenzenesulfonic acid are initially introduced into 100 parts by volume of glacial acetic acid and 15 parts by volume of 31% hydrochloric acid and diazotized at 5°–10° C. (external cooling) with 10 parts by volume of 5N sodium nitrite solution. The batch is stirred for another hour, and the nitrite excess is then destroyed with sulfamic acid.

20 parts by volume of 4N sodium acetate solution and 10 parts by volume of a 10% aqueous solution of a nonionic auxiliary based on the reaction product obtained from 1 mol of oleyl alcohol and 25 mol of ethylene oxide are introduced into the diazonium salt solution clarified by filtration. A the solution of 17.2 parts of the coupling component from Example 2m listed in Table I in 250 parts by volume of N-methyl-2-pyrrolidone and 20 parts by volume of glacial acetic acid is then added dropwise to this mixture at 15°–20° C. over a period of 30 minutes. After coupling is complete, 250 parts by volume of glacial acetic acid are added to the reaction mixture, and the precipitate is filtered off. The filter residue is stirred in 500 parts by volume of 10% hydrochloric acid for 1 hour, filtered off with suction, washed with water and dried.

24.0 parts of the isolated crude product are dissolved in 100 parts by volume of N-methyl-2-pyrrolidone at 90° C., and this solution is diluted with 100 parts by volume of water. In order to form a color lake, a solution of 12.0 parts of barium hydroxide octahydrate in 150 parts by volume of water is added, and the mixture is refluxed for 1 hour. 400 parts by volume of N-methyl-2-pyrrolidone are then added, and the pH of the batch is brought to 6 to 6.5 by means of glacial acetic acid. It is then refluxed for 1 hour, the monoazo compound precipitated as the calcium salt is filtered off with suction, washed first with a 1:1 mixture of water and N-methyl-2-pyrrolidone, then with water by itself, dried and milled.

A yellow pigment lake of the formula

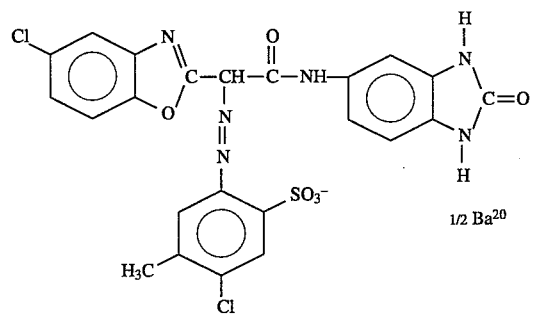

which decomposes from 344° C. upwards, is obtained.

EXAMPLES 62 to 66

If the coupling reaction is effected analogously to the procedures of Examples 3 to 6, except that in the cases below aromatic diamines of the formula $H_2N-D-NH_2$ are used instead of the monovalent diazo components used in Examples 3 to 6, this gives, if at least 2 equivalents of the coupling components of the formula (II) listed for this purpose in Table III are used during the course of the reaction according to the invention, disazo pigments of the formula (I) having the structural principle n=1, $X^1=X^2$, $R^1=R^2$, ring A=ring B.

TABLE III

| Ex. | Bisdiazo component H$_2$N-D-NH$_2$ | Coupling component from Example | m.p.[°C.] * = with decomposition | Hue |
|---|---|---|---|---|
| 62 | 3,3'-Dichlorobenzidine | 2a | 22 350 | reddish yellow |
| 63 | 1,2-Bis(2-aminophenoxy)ethane | 2a | >350 | reddish yellow |
| 64 | 1,2-Bis(2-aminophenoxy)ethane | 2m | >350 | reddish yellow |
| 65 | 1,2-Bis(4-amino-3-nitrophenoxy)ethane | 2m | 293* | orange |
| 66 | 1,2-Bis(2-amino-5-nitrophenoxy)ethane | 2b | >340 | orange |

EXAMPLE 67

13.70 parts of 2-methyl-4-nitroaniline and 1.52 parts of 2-methyl-5-nitroaniline are stirred overnight in 600 parts by volume of glacial acetic acid and 40 parts by volume of 31% hydrochloric acid. The combination of the two amines is cooled to 0° C. by addition of ice and diazotized with 20 parts by volume of 5N sodium nitrite solution. The batch is stirred for another hour, the diazonium salt solution formed is clarified by filtration, and the nitrite excess is destroyed by means of sulfamic acid.

1000 parts by volume of water, 60 parts of sodium acetate and 4 parts of the nonionic auxiliary from Example 5 are initially introduced into a coupling vessel. A hot solution at 80° C. comprising 31.0 parts of the coupling component prepared by the procedure of Example 2b in 400 parts by volume of 50% acetic acid is added, and the diazonium salt solution is added dropwise at 60° C. over a period of 30 minutes. After coupling is complete, the reaction mixture is heated to 90° C. by introducing steam, the coupling product is filtered off, washed with water and dried. The crude pigment is heated in 1000 parts by volume of a 1:1 mixture of N-methyl-2-pyrrolidone and glacial acetic acid at 100° C. for 1 hour, filtered off with suction, washed first with glacial acetic acid and then with acetone, dried and milled.

This gives a reddish yellow pigment powder having a melting point of more than 350° C. and representing a mixture of two different monoazo compounds.

EXAMPLE 68

The procedure of Example 5 is repeated, except that in this case a combination of 13.82 parts of the compound produced according to Example 2b and 1.78 parts of the compound described in Table I as Example 2j is used instead of the single coupling component used there for the azo coupling.

This gives a reddish yellow pigment mixture having a melting point of more than 350° C. and comprising two different monoazo compounds.

EXAMPLE 69

12.2 parts of 1,2-bis(2-aminophenoxy)ethane are diazotized in the manner described in Example 67, and the bisdiazonium salt solution prepared is clarified as described there.

1000 parts by volume of water, 60 parts of sodium acetate and 4 parts of the nonionic auxiliary from Example 5 are initially introduced into a coupling vessel. A hot solution at 100° C. comprising a combination of 27.64 parts of the coupling component prepared by the procedure given in Example 2b and 3.56 parts of the coupling component listed in Table I as Example 2j in 400 parts by volume of 50% acetic acid is added. The bisdiazonium salt solution is then added dropwise to this batch at 65°–70° C. over a period of 45 minutes. After coupling is complete, the reaction mixture is heated to 90° C., the precipitated reaction product is filtered off with suction, washed with water and dried.

The above mixed coupling results in a reddish yellow pigment composed of two symmetrical and one unsymmetrical disazo compound and having a melting point of more than 350° C.

We claim:

1. A pigment of the formula (I)

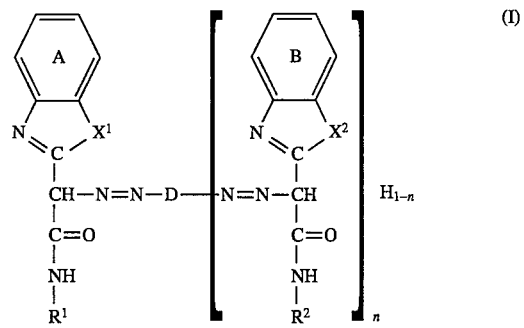

and mixtures thereof, in which

D is the radical of a diazo or bisdiazo component based on a carbocyclic or heterocyclic aromatic system, $R^1$ and $R^2$ independently of one another, are each a substituted or unsubstituted carbocyclic or heterocyclic aromatic radical, $X^1$ and $X^2$, independently of one another, are each a ring-forming —O— atom or a grouping of the formulae >NH and n has a value 0 or 1, and in which rings A and B independently of one another can each be additionally substituted and/or carry substituted or unsubstituted fused rings.

2. A pigment according to claim 1, in the case where n is 0, D and $R^1$, independently of one another, each comprise a substituted or unsubstituted aryl or heteroaryl radical from the following group:

phenyl, phenyl containing 1 to 3 substituents, naphthyl or naphthyl containing 1 to 4 substituents, a monovalent radical based on biphenylene, fluorene or anthraquinone each of which can contain up to 4 substituents, and a monovalent radical based on a heterocyclic system composed of up to 5 fused aromatic rings, in which system at least one five- or six-membered cyclic structural element each containing 1 to 3 identical or different hetero atoms belonging thereto, is incorporated and which can additionally contain a total of up to 4 substituents, these substituents on the aryl or heteroaryl radicals just mentioned, independently of one another, having the following meaning of $Z^1$ or $Z^2$, in which case $Z^1$ is a radical from the group comprising $C_1$–$C_{24}$-alkyl, $C_1$–$C_{24}$-hydroxyalkyl, $C_5$–$C_{10}$-cycloalkyl, $C_1$–$C_{24}$-alkenyl, $C_1$–$C_{24}$-alkoxy, $C_2$–$C_{25}$-alkoxycarbonyl, $C_2$–$C_{25}$-alkoxycarbonylamino, $C_2$–$C_{25}$-alkanoyl, $C_2$–$C_{25}$-alkanoyloxy, $C_2$–$C_{25}$-alkanoylamino, carboxyl, $C_2$–$C_{13}$-carboxyalkyl, N-($C_1$–$C_{12}$-alkyl)amino, N,N-di-($C_1$–$C_{12}$-alkyl)amino, carbamoyl, N-($C_1$–$C_{12}$-alkyl)aminocarbonyl, N,N-di-($C_1$–$C_{12}$-alkyl)aminocarbonyl, (aminocarbonyl)amino, $C_1$–$C_{12}$-alkylthio, $C_1$–$C_{24}$-alkylsulfonyl, sulfamoyl,N-($C_1$–$C_{12}$-alkyl)aminosulfonyl, N,N-di-($C_1$–$C_{12}$-alkyl)aminosulfonyl,(aminosulfonyl)amino, sulfo, halogen, nitro, cyano, trifluoromethyl, hydroxyl and mercapto, and $Z^2$ is a radical of the formula Ar—W—, in which W is a direct bond or a bridge-forming grouping of the formulae —O—, —CO—, —CO—O—, —O—CO—, —CO—NH—, —NH—CO—, —S—, —SO—, —$SO_2$—, —$SO_2$—NH—, —NH—$SO_2$—, —$(CH_2)_p$-(where p is from 1 to 4), —CH($CH_3$)—, —C($CH_3$)$_2$—, —NR'— (in which R' is hydrogen or $C_1$–$C_6$-alkyl), —$CH_2$—NH— or —N=N— or a combination of at least 2 bivalent grouping of this type, and the Ar bound thereto is a monovalent radical based on a system of carbocyclic nature comprising up to 2 fused aromatic rings or on a system analogous thereto in which a five- or six-membered cyclic structural element having 1 to 3 identical or different hetero atoms belonging thereto, is incorporated and which can have a total of 1 to 3 identical or different substituents of the type defined above for $Z^1$;

and in the case where n is 1, the symbol D comprises a substituted or unsubstituted arylene or heteroarylene radical from the following group:

phenylene, phenylene containing 1 to 3 substituents, naphthylene or naphthylene containing 1 to 4 substituents, a bivalent radical based on biphenylene, fluorene or anthraquinone each of which can containing up to 4 substituents, an a bivalent radical based on a heterocyclic system composed of up to 5 fused aromatic rings in which at least one five- or six-membered cyclic structure element each having 1 to 3 identical or different hetero atoms belonging thereto, is incorporated and which can additionally contain a total of up to 4 substituents, these substituents on the arylene or heteroarylene radicals have just mentioned, independently of one another, having the above meaning of $Z^1$ or $Z^2$, but furthermore, also comprises a bivalent radical of the formula —Ar—V—Ar— in which V has same meaning as the one given above for W as component of $Z^2$ or is a bridge-forming group of the formulae

—O—$CH_2$—O—, —CO—O—$CH_2$—O—CO—, —O—$C_2H_4$—O—, —CO—O—$C_2H_4$—O—CO—,

—O—$C_3H_6$—O—, —CO—O—$C_3H_6$—O—CO—, —O—$C_4H_8$—O—, —CO—O—$C_4H_8$—O—CO—,

—O—$CH_2$—C($CH_3$)$_2$—$CH_2$—O—, —O—$C_2H_4$—O—$C_2H_4$—O—, —CO—O—$C_2H_4$—O—$C_2H_4$—O—CO—,

—CO—O—, —CO—NH—NH—CO—, —NH—CO—NH—, —CO—NH—$C_2H_4$—NH—CO—,

—NH—CO—CO—NH—, —NH—CO—$C_2H_4$—CO—NH—, —CO—N⌒H H N—CO—, —CH=CH—,

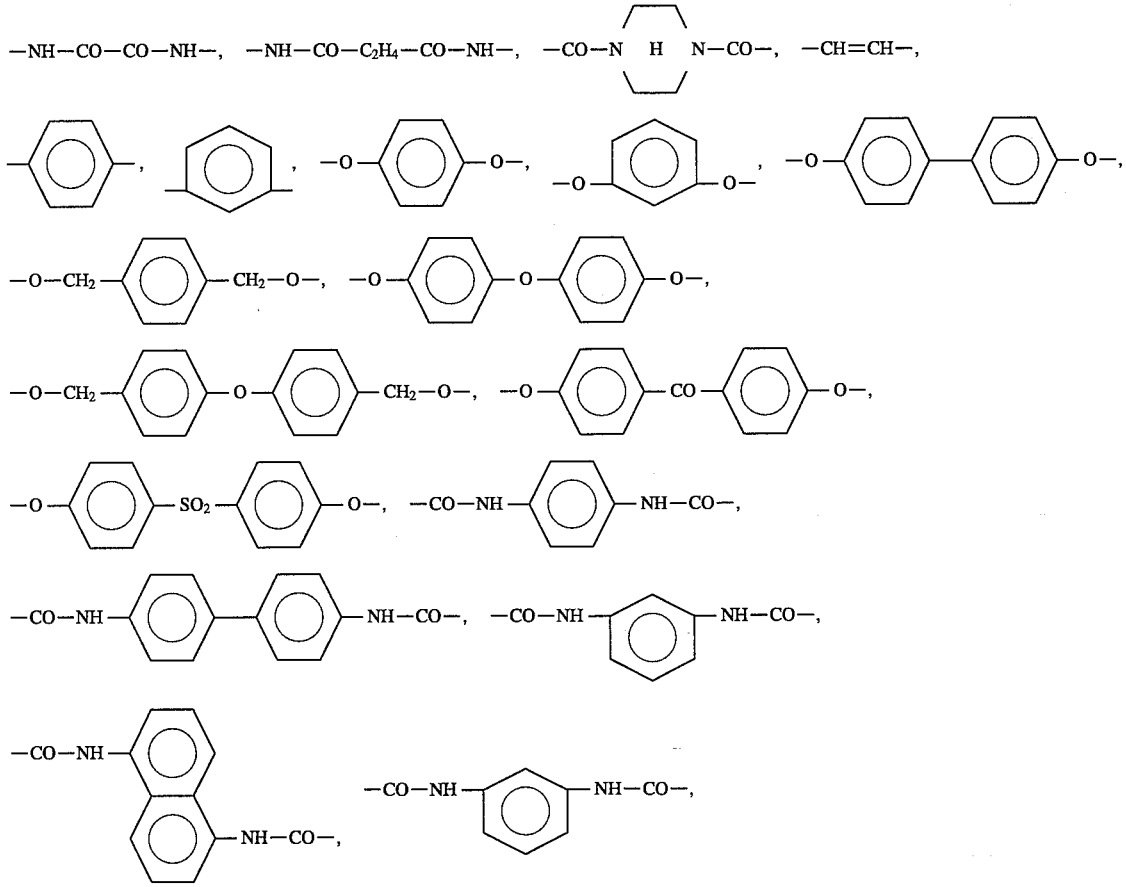

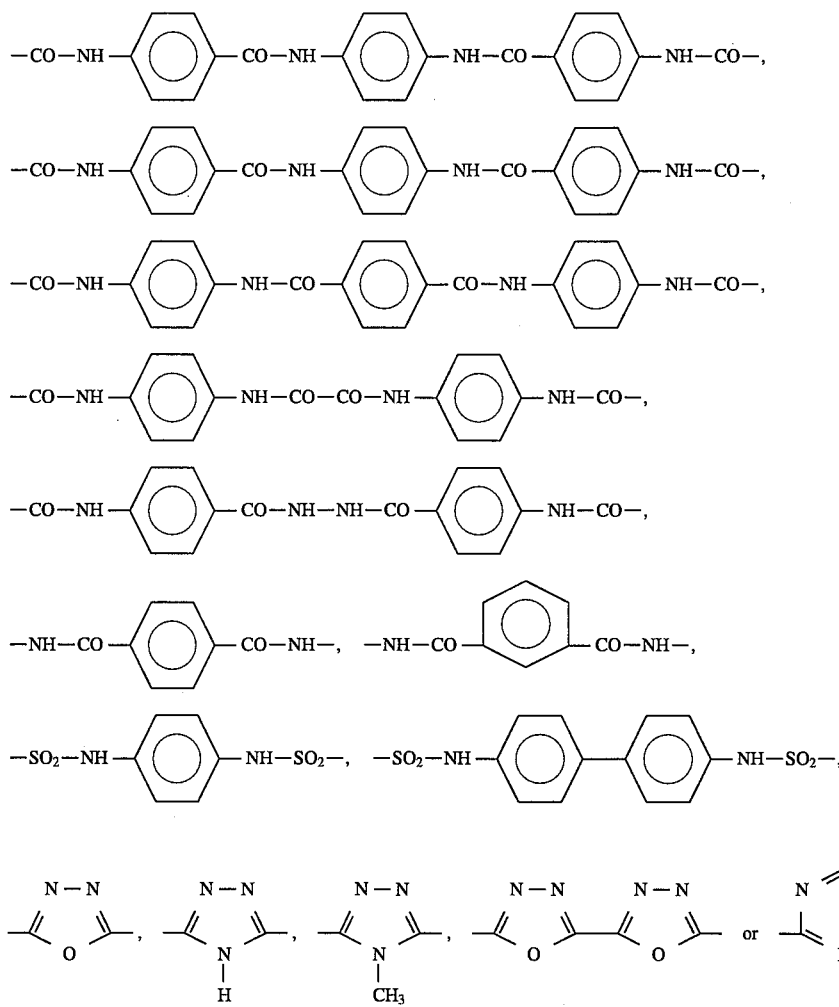

in which any arylene components which may be present in such a bridging member V can additionally contain a total of 1 to 4 identical or different substituents of the type defined above for $Z^1$, and the two Ars bound together are both, independently of one another, a bivalent radical based on an aromatic system which has the same meaning as the one given above for monovalent Ar;

$X^1$ $X^2$ have the meaning as defined in claim 1 and ring A or rings A and B independently of one another are each unsubstituted or else have 1 to 4 identical or different substituents, wherein said substituents have the above meaning of $Z^1$ or $Z^2$;

and/or ring A or rings A and B independently of one another can furthermore carry fused carbocyclic acid rings which, optionally contain substituents belonging to the $Z^1$ type and $R^2$ is the same as defined above for D and $R^1$.

3. A pigment according to claim 1 or 2, wherein in the case where n is 0, D and $R^1$, independently of one another, each comprise an aryl or heteroaryl radical from the following group:

phenyl, phenyl containing 1 to 3 substituents, naphthyl or naphthyl containing 1 to 3 substituents, a monovalent radical based on biphenylene, fluorene or anthraquinone each of which can contain 1 to 3 substituents, and a monovalent radical based on a monocyclic or polycyclic heterocyclic system composed of 2 to 3 benzo-fused aromatic rings, in which system 1 or 2 nitrogen-containing five- or six-membered cyclic structural elements having a total of up to 4 identical or different hetero atoms belonging thereto and which can in each case additionally contain 1 to 3, but a total of at most 4 substituents, not only on the heterocyclic but also on the benzo-fused components, in which these substituents on the aryl or heteroaryl radicals just mentioned have, independently of one another, the meaning of $Z^1$ or $Z^2$ given below, $Z^1$ is a radical from the group comprising $C_1$–$C_4$-alkyl, $C_1$–$C_4$-alkoxy, $C_2$–$C_5$-alkoxycarbonyl, $C_2$–$C_5$-alkanoyloxy, $C_2$–$C_5$-alkanoylamino, carboxy, carbamoyl, N-($C_1$–$C_4$-alkyl)aminocarbonyl, N,N-di-($C_1$–$C_4$-alkyl)-aminocarbonyl, $C_1$–$C_4$-alkylsulfonyl, sulfamoyl, N-($C_1$–$C_4$-alkyl)aminosulfonyl, N,N-di($C_1$–$C_4$-alkyl)aminosulfonyl, sulfo, chlorine, bromine, nitro, cyano, trifluoromethyl or hydroxyl, and $Z^2$ is a radical of the formula Ar—W—, in which W is a direct bond or a bridge-forming grouping of the formulae —O—, —CO—O—, —O—CO—, —CO—NH—, —NH—CO—, —S—, —SO$_2$—, —SO$_2$—NH—, —NH—SO$_2$—, —CH$_2$—, CH$_2$—CH$_2$—, —NH—, —NH—CH$_2$ or —N=N— or a combination of at least 2 bivalent groupings of this type, and the Ar bound thereto is phenyl, naphthyl, or phenyl together with the fused-on five- or six-membered nitrogen-containing aromatic ring having 1 to 2 identical or different hetero atoms belonging thereto, or is such a monovalent aryl or heteroaryl radical Ar additionally containing 1 to 3 identical or different substituents of the type defined above for $Z^1$, and, in the case where n is 1, the symbol D comprises an arylene or heteroarylene radical from the following group; phenylene, phenylene containing 1 to 3 substituents, naphthylene, or naphthylene containing 1 to 3 substituents, a bivalent radical based on biphenylene, fluorene or anthraquinone each of which can contain 1 to substituents, and a bivalent radical based on a monocyclic or polycyclic heterocyclic system composed of 2 or 3 benzo-fused aromatic rings in which 1 or 2 nitrogen-containing five- or six-membered cyclic structural elements having a total of up to 4 identical or different hetero atoms belong thereto are incorporated and which can in each case additionally contain 1 to 3, but a total of at most 4 substituents, not only on the heterocyclic but also on the benzo-fused components, these substituents on the arylene or heteroarylene radicals just mentioned having, independently of one another, the above meaning of $Z^1$ or $Z^2$, but furthermore also a bivalent radical of the formula —Ar—V—Ar—, in which V has the same meaning as the one give above for W as component of $Z^2$ or is a bridge-forming grouping of the formulae $-O-C_2H_4-O-$, $-CO-O-C_2H_4-O-CO-$, $-O-C_3H_6-O-$, $-CO-O-C_3H_6-O-CO-$, $-SO_2-C_2H_4-SO_2-$, $-CO-NH-C_2H_4-NH-CO-$, $-SO_2-NH-C_2H_4-NH-SO_2-$,

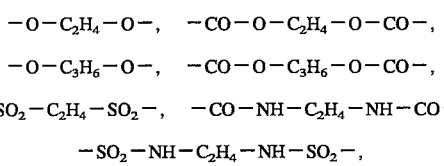

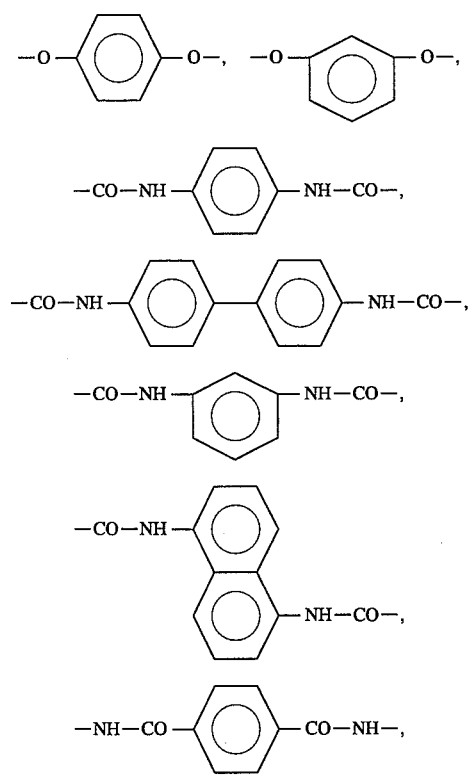

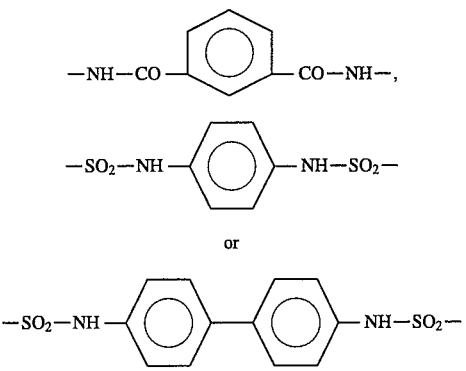

in which any arylene components which may be present in such a bridging member V can additionally contain a total of 1 to 4 identical or different substituents of the type defined above for $Z^1$, and the two Ars bound thereto are each, independently of one another, a bivalent aromatic radical based on one of the same specific ring systems as the one give above for monovalent Ar;

$X^{1-}$ and $X^2$, independently of one another, are each a ring-forming —O— atom or a grouping of the formulae >NH, and ring A or rings A and B independently of one another are each unsubstituted or else can contain up to 2 identical or different substituents of the $Z^1$ type and $R^2$ is the same as defined for D and $R^1$.

4. A pigment according to claim 1, 2 or 3 wherein in the case where n is 0, D and $R^1$, independently of one another, each comprise an aryl or heteroaryl radical from the following group; phenyl, naphthyl or biphenyl, a monovalent radical based on biphenylene, fluorene or anthraquinone, and a monovalent radical of heterocyclic structure based on benzimidazole, benzimidazol-2-one, benzimidazole-2-thione, benzoxazole, benzoxazol-2-one, benzothioazole, benzothiazol-2-one, indazole, benzothiazole, indole, isoindole, phthalimide, phthalimid-2-one, naphthalimide, naphthalimid-2-one, thiazole, isothiazole, 1,2,4-thiadiazole, 1,3,4-thiadiazole, thiophene, thionaphthene, quinoline, quinolin-2-one, quinoline-2,4-dione, isoquinoline, cinnoline, quinazoline, quinazolin-4-one, quinazoline-2,4-dione, phthalazine, phthalazine-1,4-dione, quinoxaline, quinoxaline-2,3-dione, carbazole, phenazine, benzimidazo(1,2-a)pyrimid-2-one, benzo(e)(1,3)oxazine-2,4-dione,benzo(e)(1,4)oxazine-3-one, benzo(cd)indol-2-one, benzo(de)isoquinoline-1,3-dione and dibenzo(a,c)phenazine, each of which can additionally contain 1 to 3 identical or different substitutents, in accordance with the meaning apparent for $Z^1$ or $Z^2$ wherein $Z^1$ is a radical from the group comprising $C_1$-$C_4$-alkyl, $C_1$-$C_4$-alkoxy, $C_2$-$C_5$-alkanoylamino, carboxy, carbamoyl, N-($C_1$-$C_4$-alkyl)aminocarbonyl, N,N-di-($C_1$-$C_4$-alkyl)aminocarbonyl, $C_1$-$C_4$-alkylsulfonyl, sulfamoyl, N-($C_1$-$C_4$-alkyl)aminosulfonyl, N,N-di($C_1$-$C_4$-alkyl)aminosulfonyl, sulfo, chlorine, bromine, nitro, cyano, trifluoromethyl and hydroxyl, and $Z^2$ is a radical of the formula Ar—W—, in which W is a direct bone or a bridge-forming grouping of the formulae —O—, —CO—O—, —O—CO—, —CO—NH—, —NH—CO—, —S—, —SO$_2$—, —SO$_2$—NH—, —NH—SO$_2$, —CH$_2$—, CH$_2$—CH$_2$—, —NH—, —NH—CH$_2$ or —N=N— or a combination of at least two bivalent groupings of this type, and the Ar bound thereto is phenyl, naphthyl, or phenyl together with the fused-on five- or six-membered nitrogen-containing aromatic ring having 1 or 2 identical or different hetero atoms belonging thereto, or is such a monovalent aryl or heteroaryl radical Ar additionally containing 1 to 3 identical or different substitutents of the type defined above for $Z^1$; and, in the case where n is 1, the symbol D comprises an arylene or heteroarylene radical from the following group; phenylene, naphthylene or biphenyldiyl, a bivalent radical based on biphenylene, fluorene or anthraquinone, and a bivalent radical of heterocyclic structure based on benzimidazole, benzimidazol-2-one, benzoxazole, benzothiazole, benzotriazole, phthalimide, quinoline, isoquinoline, quinazoline, quinazolin-4-one, quinoxaline, quinoxaline-2,3-dione, thionaphthene, carbazole, 2,2'-bipyridine, benzo(e)(1,3)oxazine-2,4-dione, dibenzo(b,d)thiophene 5,5-dioxide, thioxanthene 10, 10-dioxide, pyrrolo(3,4-f)isoindole-1,3,5,7-tetraone, 5H-phenanthridin-6-one and 4,9-dihydro-pyrido(2,3,4,5-lmn)phenanthridine-5,10-dione, each of which can additionally contain 1 to 3 identical or different substitutents, primarily of non-ionic character, in accordance with the meaning apparent for $Z^1$ or $Z^2$ as defined above, or a combination of 2-heterocyclic radicals of this type bound to one another by a single bond or one thereof together with phenylene; and in which $X^1$, $X^2$, A and B each having the meaning $X^1$ and $X^2$ independently of one another, are each a ring-forming —O— atom or a grouping of the formulae >NH and ring A or rings A and B independently of one another are each unsubstituted or else can contain up to 2 identical or different substituents of the $Z^1$ type and $R^2$ is the same as defined above for D and $R^1$.

5. A pigment according to claim 1, 2, 3 or 4 wherein n has the value 0 and $X^1$ is a bridging member of the O— or >NH type.

6. A method of pigmenting high-molecular-weight organic materials of natural or synthetic origin comprising the step of incorporating a pigment of the formula (I) as claimed in claim 1 or a mixture of said pigments into said organic materials.

7. A method as claimed in claim 6, wherein textile substrates or sheet-like structures made of paper are pigmented or printed with said pigments in finely divided form from aqueous or water-containing systems.

8. A method as claimed in claim 6, wherein moldable plastics in the form of plastic compositions, melts or spinning solutions are pigmented.

9. A method as claimed in claim 6, wherein gloss or emulsion paints or printing inks are pigmented.

* * * * *